(12) United States Patent
Narahara

(10) Patent No.: US 6,990,631 B2
(45) Date of Patent: Jan. 24, 2006

(54) DOCUMENT MANAGEMENT APPARATUS, RELATED DOCUMENT EXTRACTING METHOD, AND DOCUMENT PROCESSING ASSIST METHOD

(75) Inventor: Kouichi Narahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 768 days.

(21) Appl. No.: 09/901,018

(22) Filed: Jul. 10, 2001

(65) Prior Publication Data

US 2002/0059227 A1 May 16, 2002

(30) Foreign Application Priority Data

| Jul. 14, 2000 | (JP) | ............................. 2000-214106 |
| Nov. 10, 2000 | (JP) | ............................. 2000-342758 |
| Apr. 18, 2001 | (JP) | ............................. 2001-118992 |

(51) Int. Cl.
  *G06F 17/30* (2006.01)
  *G06F 7/00* (2006.01)
  *G06F 12/00* (2006.01)

(52) U.S. Cl. .......................... 715/511; 707/1; 707/200; 707/205; 707/2; 707/3; 707/4; 707/5; 707/6; 707/7; 707/8

(58) Field of Classification Search ................ 715/511, 715/512; 707/203, 204
See application file for complete search history.

(56) References Cited

U.S. PATENT DOCUMENTS

| 6,012,083 A | * | 1/2000 | Savitzky et al. ............ 709/202 |
| 6,012,087 A | * | 1/2000 | Freivald et al. ............. 709/218 |
| 6,119,117 A | * | 9/2000 | Yoda et al. ................... 707/10 |
| 6,151,132 A | * | 11/2000 | Urquhart et al. ........... 358/1.14 |
| 6,260,042 B1 | * | 7/2001 | Curbera et al. ............. 707/101 |
| 6,298,344 B1 | * | 10/2001 | Inaba et al. .................... 707/5 |
| 6,574,657 B1 | * | 6/2003 | Dickinson .................. 709/203 |
| 6,578,053 B1 | * | 6/2003 | Kidokoro et al. ........... 707/201 |
| 6,694,336 B1 | * | 2/2004 | Multer et al. ............... 707/201 |

FOREIGN PATENT DOCUMENTS

| JP | 7-282059 | 10/1995 |
| JP | 2000-20202 | 1/2000 |

* cited by examiner

*Primary Examiner*—William Bashore
*Assistant Examiner*—N Hillery
(74) *Attorney, Agent, or Firm*—Dickstein Shapiro Morin & Oshinsky LLP

(57) ABSTRACT

In a document management apparatus and related document extracting method of the present invention, an operational history record of one of stored documents is generated every time an operation on the one of the stored documents is performed by a document operation device. The generated operational history records are stored. It is determined whether a selected item of the operational history record, stored for a currently processed document among the stored documents of the group, matches with a corresponding item of each of the operational history records, stored for the remaining ones of the stored documents other than the currently processed document, so that a list of related documents, which are related to the currently processed document, is extracted from the remaining ones of the stored documents, based on results of the matching.

28 Claims, 30 Drawing Sheets

| | 611 | 612 | 613 | 614 | 615 |
|---|---|---|---|---|---|
| | USER ID OF OPERATOR | OPERATION TYPE | OPERATION TIME PERIOD | NO. OF REFERENCE ACCESSES | AMOUNT OF COPIED DATA |
| | CCC | NEW RECORDING | 2000/4/1/PM 14:00– 2000/4/1/PM 14:05 | 4.C:¥dir1¥F.txt 3.C:¥dir2¥B.txt | 35.C:¥dir1¥F.txt 20.C:¥dir2¥B.txt |
| | AAA | OVERWRITING | 2000/4/26/PM 15:00– 2000/4/26/PM 15:30 | 8.C:¥dir1¥G.txt | 0 |
| | AAA | PRINTING | 2000/4/26/PM 15:30– 2000/4/26/PM 15:31 | 0 | 0 |

FIG.4

| 401 KIND OF DOCUMENT | 402 NAME OF WRITER | 403 NAME OF DOCUMENT | 404 OPERATIONAL HISTORY | 405 LOCATION OF STORAGE |
|---|---|---|---|---|
| TECHNICAL REPORT | AAA | A.txt | A.xls | C:¥dir1¥dirA |
| PATENT | AAA | B.txt | B.xls | C:¥dir2 |
| RESEARCH PAPER | BBB | C.txt | C.xls | C:¥dir2 |
| TECHNICAL REPORT | CCC | D.txt | D.xls | C:¥dir1¥dirA |

FIG.5

| NAME OF OPERATOR (411) | DATE AND TIME OF OPERATION (412) | TYPE OF OPERATION (413) |
|---|---|---|
| CCC | 2000/4/1/PM 14:00 | NEW RECORDING |
| AAA | 2000/4/26/PM 15:00 | OVERWRITING |
| AAA | 2000/4/26/PM 15:05 | PRINTING |

FIG.11

| KIND OF DOCUMENT | NAME OF WRITER | NAME OF DOCUMENT | OPERATIONAL HISTORY | LOCATION OF STORAGE | RD INDICATION LIST |
|---|---|---|---|---|---|
| TECHNICAL REPORT | AAA | A.txt | A.xls | C:¥dir1¥dirA | C:¥dir2¥B.txt.C:¥dir2¥C.txt |
| PATENT | AAA | B.txt | B.xls | C:¥dir2 | C:¥dir1¥dirA¥A.txt |
| RESEARCH PAPER | BBB | C.txt | C.xls | C:¥dir2 | C:¥dir1¥dirA¥A.txt |
| TECHNICAL REPORT | CCC | D.txt | D.xls | C:¥dir1¥dirA | C:¥dir1¥E.txt |

| USER ID OF OPERATOR 611 | OPERATION TYPE 612 | OPERATION TIME PERIOD 613 | NO. OF REFERENCE ACCESSES 614 | AMOUNT OF COPIED DATA 615 |
|---|---|---|---|---|
| CCC | NEW RECORDING | 2000/4/1/PM 14:00–<br>2000/4/1/PM 14:05 | 4.C:¥dir1¥F.txt<br>3.C:¥dir2¥B.txt | 35.C:¥dir1¥F.txt<br>20.C:¥dir2¥B.txt |
| AAA | OVERWRITING | 2000/4/26/PM 15:00–<br>2000/4/26/PM 15:30 | 8.C:¥dir1¥G.txt | 0 |
| AAA | PRINTING | 2000/4/26/PM 15:30–<br>2000/4/26/PM 15:31 | 0 | 0 |

DOCUMENT MANAGEMENT APPARATUS, RELATED DOCUMENT EXTRACTING METHOD, AND DOCUMENT PROCESSING ASSIST METHOD

BACKGROUND OF THE INVENTION

1. Field of the Invention

The present invention generally relates to a document management apparatus which manages a group of documents stored in a document storage device, and more particularly to a document management technique which extracts related documents, related to a currently processed document, from the group of stored documents in order to help the user process the current document.

2. Description of the Related Art

Currently, various document processing methods for extracting related documents from a group of stored documents are known. For example, a computer file system which performs a document management using a multilevel hierarchy of directories is known. Several retrieval tools that use the keyword search to find out a document containing specified words from a group of stored documents are known. A World-Wide Web (WWW) system is capable of linking documents, which are related to each other, into an information database that is stored in computers. A WWW browser is provided with a function to display a fixed number of viewed document records for a fixed period of time. In addition, another WWW browser is provided with a capability of determining ranking of stored documents by the frequency of reading of each document.

Generally, when the user performs document operations, such as document processing, storing, printing or viewing, there is a demand for extracting related documents, which are related to the currently processed document, from a group of stored documents. In addition, there is a demand for managing a collection of related documents that are related to a specific document.

In the case of the method using the hierarchy of directories on the computer file system, it is necessary to classify the documents into categories and determine the location in the directories where each document is stored. As the number of the stored documents increases, it is also necessary to change the document classification. The workload related to the document classification and the change thereof will grow accordingly.

In the case of the method using the keyword search, it is possible to find out related documents containing specified words from a group of stored documents. However, the inputting of a keyword list to the computer is required. Selection of a keyword list appropriate to find out the related document is a difficult task to be done.

The use of the WWW system facilitates the retrieval of related documents. However, it is necessary to perform preparatory tasks to determine the relation of the respective documents and generate the links between the related documents before the information database is stored in the computers.

Japanese Laid-Open Patent Application No.2000-20202 discloses a document management method. In the document management method disclosed by the above publication, a number of viewed data records are analyzed in accordance with selection criteria of importance parameters specified by the user. According to the results of the analysis, a list of viewed data records having higher values of the importance parameters is displayed by using user-defined symbols.

Although the above-mentioned method allows the user to look into the viewed data records having higher values of the importance parameters, it does not facilitate retrieving the data of the related documents, which are related to the currently processed document, from the group of stored documents. In the above-mentioned method, the user is required to define the relationship between the symbols and the selection criteria before the displaying of the list of viewed data records is performed.

Japanese Laid-Open Patent Application No.7-282059 discloses a document management method. In the document management method disclosed by the above publication, a degree of relation is calculated for each of related documents, which are currently processed by the user. The degrees of relation of the related documents are displayed to provide the user with a view of an entire structure of relation of all the related documents.

However, in the above-mentioned method, the degrees of relation of the related documents are not stored in the system after the end of the document processing. It is impossible for the user to access the relation data of the related documents previously calculated, when the user returns to process the same document later.

SUMMARY OF THE INVENTION

An object of the present invention is to provide an improved document management apparatus in which the above-described problems are eliminated.

Another object of the present invention is to provide a document management apparatus that automatically extracts the related documents, related to the currently processed document, from the group of stored documents, without the needs for performing the preparatory tasks, such as document classification, document relation determination and keyword inputting.

Another object of the present invention is to provide a related document extracting method that automatically extracts the related documents, related to the currently processed document, from the group of stored documents, without the needs for performing the preparatory tasks, such as document classification, document relation determination and keyword inputting.

Another object of the present invention is to provide a document processing assist method that allows the user to easily access the related documents of the currently processed document extracted from the group of stored documents, without the needs for the preparatory tasks, in order to help the user process the current document.

The above-mentioned objects of the present invention are achieved by a document management apparatus which manages a group of documents stored in a document storage device, the document management apparatus comprising: a first unit which generates an operational history record of one of the stored documents of the group every time an operation on the one of the stored documents is performed by a document operation device; a second unit which stores the operational history records generated by the first unit; and a third unit which determines whether a selected item of the operational history record, stored for a currently processed document among the stored documents of the group, matches with a corresponding item of each of the operational history records, stored for the remaining ones of the stored documents other than the currently processed document, so that the third unit extracts a list of related documents, which are related to the currently processed document, from the remaining ones of the stored documents of the group, based on results of the matching.

The above-mentioned objects of the present invention are achieved by a related document extracting method for use in a document management apparatus which manages a group of documents stored in a document storage device, the related document extracting method comprising the steps of: generating an operational history record of one of the stored documents of the group every time an operation on the one of the stored documents is performed by a document operation device; storing the operational history records generated in said generating step; determining whether a selected item of the operational history record, stored for a currently processed document among the stored documents of the group, matches with a corresponding item of each of the operational history records, stored for the remaining ones of the stored documents other than the currently processed document; and extracting a list of related documents, which are related to the currently processed document, from the remaining ones of the stored documents of the group, based on results of the matching in the determining step.

The above-mentioned objects of the present invention are achieved by a document processing assist method for use in a document management apparatus which manages a group of documents stored in a document storage device, the document processing assist method comprising the steps of: generating an operational history record of one of the stored documents of the group every time an operation on the one of the stored documents is performed by a document operation device; storing the operational history records generated in said generating step; determining whether a selected item of the operational history record, stored for a currently processed document among the stored documents of the group, matches with a corresponding item of each of the operational history records, stored for the remaining ones of the stored documents other than the currently processed document; extracting a list of related documents, which are related to the currently processed document, from the remaining ones of the stored documents of the group, based on results of the matching in the determining step; and transmitting the list of related documents from the document management apparatus to an output unit of the document operation device so that the output unit provides the list of related documents, received from the document management apparatus, to an operator who processes the current document on the document operation device.

In the document management apparatus and the related document extracting method of the present invention, respective operational history records of a group of stored documents are generated in response to an operation performed on each document by a document operation device. The generated operational history records are stored. It is determined whether a selected item of the operational history record, stored for a currently processed document among the stored documents of the group, matches with a corresponding item of each of the operational history records, stored for the remaining ones of the stored documents other than the currently processed document, so that a list of related documents, which are related to the currently processed document, is extracted from the remaining ones of the stored documents, based on results of the matching. The document management apparatus and related document extracting method of the present invention are effective in automatically extracting the related documents, related to the currently processed document, from the group of stored documents. It is unnecessary for the present invention to perform the preparatory tasks, such as the document classification, the document relation determination and keyword inputting as in the conventional methods.

BRIEF DESCRIPTION OF THE DRAWINGS

Other objects, features and advantages of the present invention will be apparent from the following detailed description when read in conjunction with the accompanying drawings.

FIG. 4 is a diagram for explaining an example of document management information in a first preferred embodiment of the document management apparatus of the invention.

FIG. 5 is a diagram for explaining an example of operational history records in the first preferred embodiment of the document management apparatus.

FIG. 11 is a diagram for explaining an example of document management information in a second preferred embodiment of the document management apparatus of the invention.

FIG. 12 is a diagram for explaining an example of operational history records in the second preferred embodiment of the document management apparatus.

DETAILED DESCRIPTION OF PREFERRED EMBODIMENTS

A description will now be provided of preferred embodiments of the document management apparatus, the related document extracting method and the document processing assist method of the present invention with reference to the accompanying drawings.

Figure 1:
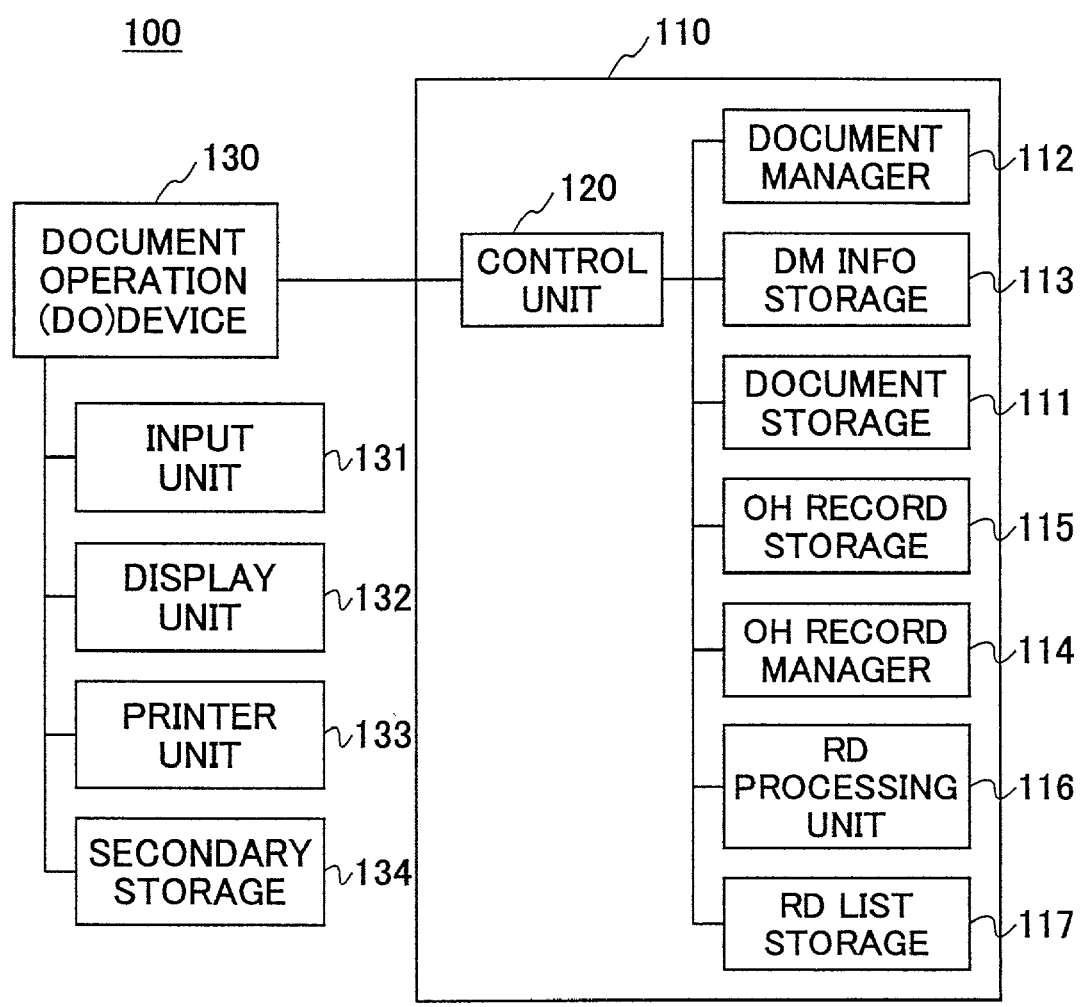
FIG. 1 is a block diagram of a document processing/management system to which one preferred embodiment of the document management apparatus of the invention is applied.

FIG. 1 shows a document processing/management system 100 to which one preferred embodiment of the document management apparatus of the invention is applied.

As shown in FIG. 1, the document processing/management system 100 generally includes a document management (DM) apparatus 110 and a document operation (DO) device 130. The DO device 130 is connected to the DM apparatus 110. The DM apparatus 110 manages a group of documents stored in a document storage unit 111. The DO device 130 is provided for an operator to process any of the stored documents in the DM apparatus 110.

The document operation (DO) device 130 generally includes an input unit 131, a display unit 132, a printer unit 133, and a secondary storage unit 134. The input unit 131 is a keyboard or mouse, which is provided for the operator to input data, commands or selections to the system. The display unit 132 displays document information or other data for use by the operator when processing the current document. The printer unit 133 prints out document information or other data for use by the operator when processing the current document.

In the document processing/management system 100 of FIG. 1, a single DO device 130 that is connected to the DM apparatus 110 is illustrated, for the sake of simplicity of description. Alternatively, a plurality of DO devices 130, which are similar to the DO device 130 shown in FIG. 1, may be connected to the DM apparatus 110.

According to the present invention, each of the display unit 132 and the printer unit 133 is an output unit that provides a list of related documents, received from the DM apparatus 110, to the operator who processes the current document on the DO device 130.

In the document management (DM) apparatus 110 of FIG. 1, the document storage unit 111 stores a group of documents. A document manager 112 manages the group of documents stored in the document storage unit 111. A document management (DM) information storage unit 113 stores DM information, which is used by the document manager 112 when managing the group of the stored documents of the document storage unit 111. An operational history (OH) record manager 114 generates and manages respective operational history records, which are related to any of the stored documents of the document storage unit 111. An operational history (OH) record storage unit 115 stores the respective operational history records, which are generated by the OH record manager 114.

Further, in the document management (DM) apparatus 110 of FIG. 1, a related document (RD) processing unit 116, a related document (RD) list storage unit 117, and a control unit 120 are provided. The control unit 120 controls the entire operation of the document management apparatus 110 and the respective operations of the above-mentioned elements 111 through 117.

The RD processing unit 116 determines whether a selected item of the operational history record, stored for a currently processed document among the stored documents of the group, matches with a corresponding item of each of the operational history records, stored for the remaining ones of the stored documents other than the currently processed document, so that the RD processing unit 116 extracts a list of related documents, which are related to the currently processed document, from the remaining ones of the stored documents of the group, based on results of the matching. Furthermore, the RD processing unit 116 stores a correlation between the list of related documents generated by the RD processing unit 116 and the user ID of the operator who has processed the current document on the DO device 130, into the RD list storage unit 117 together with the list of related documents. The correlation is stored in the RD list storage unit 117 with respect to each of respective authorized operators of the DO device 130. The control unit 120 transmits the list of related documents, stored in the RD list storage unit 117, from the DM apparatus 110 to the DO device 130.

On the side of the document operation (DO) device 130, the list of related documents is received from the DM apparatus 110, and, when the operator processes the current document on the DO device 130, the output unit of the DO device 130 provides the list of related documents to the operator in a recognizable form in accordance with the correlation stored in the RD list storage unit 117.

The document processing/management system 100 described above is incorporated into either a centralized system or a distributed system. In a case of the centralized system, the document management (DM) apparatus 110 and the document operation (DO) device 130 are incorporated into a general-purpose computer. In a case of the distributed system, the DM apparatus 110 may be connected to the DO device 130 via a network in order to incorporate the DM apparatus 110 and the DO device 130 into the network in a distributed manner. In the case of the distributed system, the document manager 112 of the DM apparatus 110 may be connected to the document storage unit 111 via a network.

Figure 2:
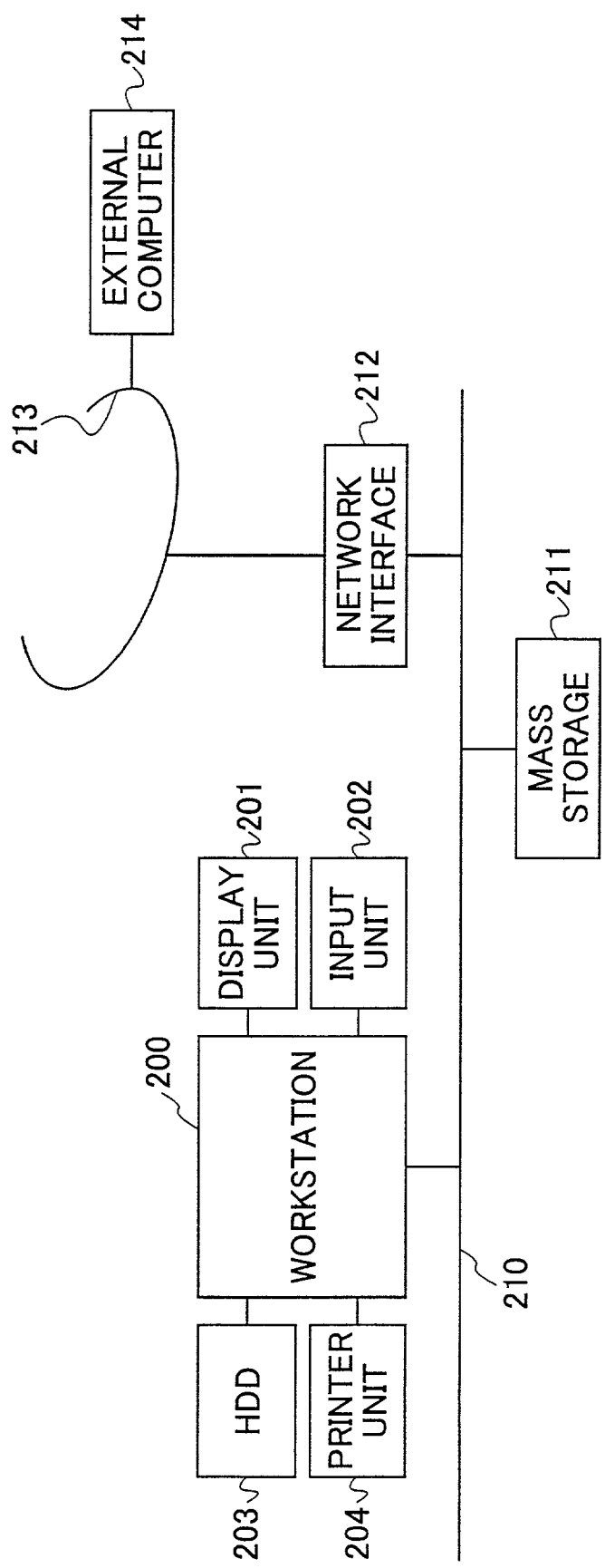
FIG. 2 is a block diagram of a centralized system in which the document processing/management system is incorporated.

FIG. 2 shows a centralized system in which the document processing/management system is incorporated.

As shown in FIG. 2, a workstation 200, which is a general-purpose computer, is provided with a display unit 201, an input unit 202, a hard disk drive (HDD) 203 and a printer unit 204. In the present embodiment, the software (a computer program or a computer-readable recording medium storing program code instructions), which makes use of the hardware resources of the workstation 200 (the peripheral devices 201 through 204 of the workstation 200 mentioned above), is provided within the workstation 200, in order to incorporate the DM apparatus 110 and the DO device 130 of the document processing/management system 100 therein.

In the centralized system of FIG. 2, the workstation 200 is connected to a mass storage unit 211 via a local area network (LAN) 210. The LAN 210 is connected through a network interface unit 212 to a network 213. The network 213 may be either the Internet or another local area network. The network interface unit 212 may be either a router or a gateway device. An external computer 214 is connected through a network interface unit (not shown) to the network 213.

In the centralized system of FIG. 2, the hardware resources of the workstation 200 are selectively utilized to provide the storage units 111, 113, 115 and 117 of the DM apparatus 110. For example, the HDD 203 may be used to provide all the storage units 111, 113, 115 and 117 of the DM apparatus 110. Alternatively, the mass storage unit 211, which is connected to the workstation 200 via the LAN 210, may be used to provide the document storage unit 111, and the HDD 203 may be used to provide the storage units 113, 115 and 117. Further, a mass storage unit, which is connected to the external computer 214, may be used to provide the entire document storage unit 111 or part of the document storage unit 111.

As described above, in the centralized system of FIG. 2, a computer program or a computer-readable recording medium storing program code instructions, which makes use of the hardware resources of the workstation 200 or others, is provided, in order to incorporate the DM apparatus 110 and the DO device 130 of the document processing/management system 100. Further, a computer program or a computer-readable recording medium storing program code instructions, which makes use of the hardware resources of the workstation 200 or others, in order to realize the related document extracting method or the document processing assist method of the present invention, which is executed on the DM apparatus 110 or the DO device 130 of the document processing/management system 100. Examples of the computer-readable recording medium include magnetic disks, optical disks, magneto-optical disks, and semiconductor memory devices.

Figure 3:
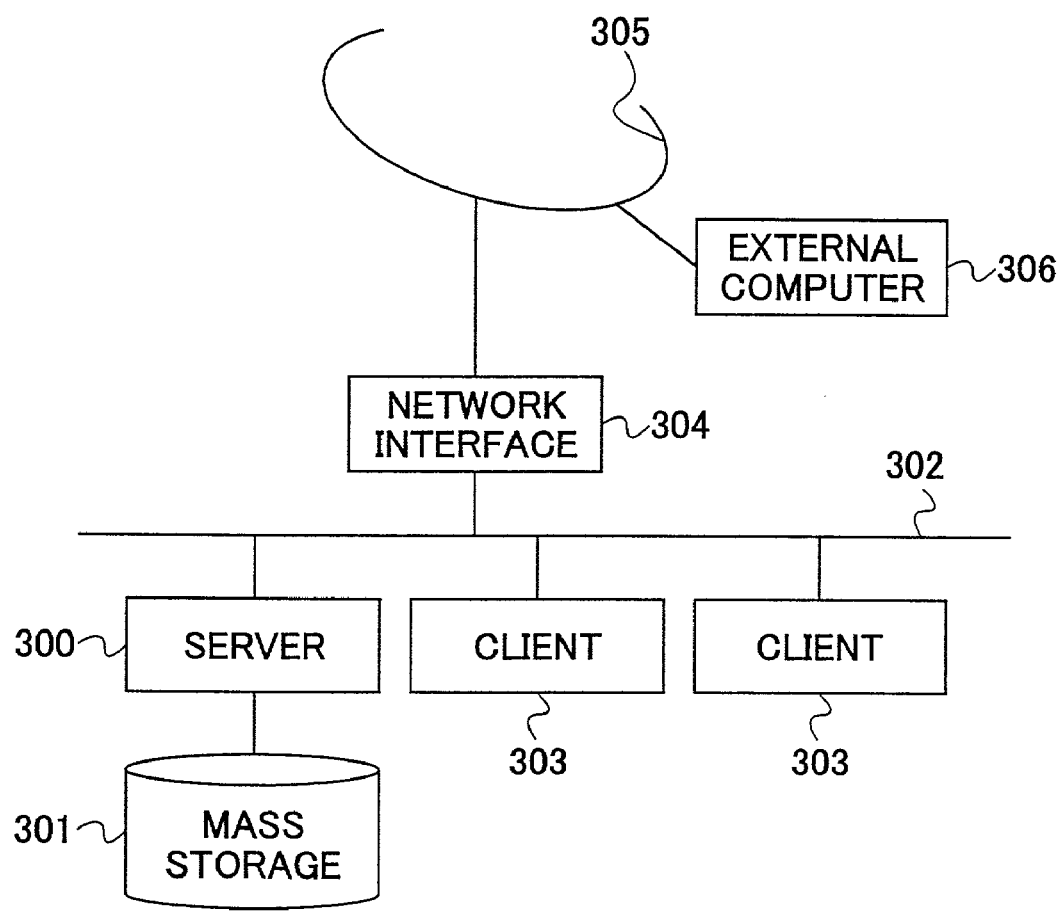
FIG. 3 is a block diagram of a distributed system in which the document processing/management system is incorporated.

FIG. 3 shows a distributed system in which the document processing/management system is incorporated.

As shown in FIG. 3, a server 300, which is a workstation or computer that operates as a server machine, is provided on a local area network (LAN) 302. The server 300 is provided with a mass storage device 301. In the present embodiment, the software (a computer program or a computer-readable recording medium storing program code instructions), which makes use of the hardware resources of the server 300 (the mass storage device 301 mentioned above), is provided within the server 300, in order to incorporate the DM apparatus 110 of the document processing/management system 100 therein.

In the distributed system of FIG. 3, the server 300 is connected through the LAN 302 to one or a plurality of clients 303. Each client 303 is a personal computer that operates as a client machine on the LAN 302. The LAN 302 is connected through a network interface unit 304 to a network 305. The network 305 may be either the Internet or another local area network. The network interface unit 304 may be either a router or a gateway device. An external computer 306 is connected through a network interface unit (not shown) to the network 305.

As described above, in the distributed system of FIG. 3, a computer program or a computer-readable recording medium storing program code instructions, which makes use of the hardware resources of the one or plurality of clients 303, is provided, in order to incorporate one or plurality of the DO devices 130 of the document processing/management system 100. Alternatively, a computer program or a computer-readable recording medium storing program code instructions, which makes use of the hardware resources of the external computer 306 or the like connected to the network 305, may be provided in order to incorporate one or plurality of the DO devices 130 of the document processing/management system 100.

In the distributed system of FIG. 3, the hard disk drive 301 of the server 300 is used to provide the storage units 111, 113, 115 and 117 of the DM apparatus 110. Alternatively, another hard disk drive connected to the LAN 302, or another mass storage device of the external computer 306, may be used to provide the entire document storage unit 111 or part of the document storage unit 111.

Further, a computer program or a computer-readable recording medium storing program code instructions, which makes use of the hardware resources of the server 300, is provided in the distributed system of FIG. 3 in order to realize the related document extracting method or the document processing assist method of the present invention, which is executed on the DM apparatus 110 or the DO device 130 of the document processing/management system 100. Examples of the computer-readable recording medium include magnetic disks, optical disks, magneto-optical disks, and semiconductor memory devices.

Next, a description will be given of a first preferred embodiment of the document management apparatus, the related document extracting method, and the document processing assist method of the present invention with reference to FIG. 4 through FIG. 10. The related document extracting method and the document processing assist method of the present invention are executed by the hardware and software resources of the document processing/management system 100 of FIG. 1.

In the document management (DM) apparatus 110 of FIG. 1, the document manager 112 manages the group of the stored documents of the document storage unit 111 as a relational type database. The software (the computer program or the computer-readable recording medium), which is called a relational database management system (DBMS), is used to provide the document manager 112 in the document management apparatus of the present embodiment.

FIG. 4 shows an example of the document management (DM) information, which is generated by the document manager 112 and stored into the DM information storage unit 113. The document manager 112 reads the DM information from the storage unit 113, in order to manage the group of the stored documents of the document storage unit 111.

As shown in FIG. 4, the DM information, stored in the DM information storage unit 113, is configured into a number of DM information records, and there is a one-to-one correspondence between the DM information records of the DM information storage unit 113 and the stored documents of the group of the document storage unit 111. In the present embodiment, each of the DM information records includes five fields: document kind 401, writer name 402, document name 403, operational history 404, and storage location 405.

In each of the DM information records stored in the DM information storage unit 113, the document kind field 401 contains an item of document kind, which indicates a kind of a corresponding one of the stored documents of the document storage unit 111. Examples of document kind in the DM information shown in FIG. 4 include a technical report, a patent document, a research paper, and others. The writer name field 402 contains an item of writer name, which indicates a name of a writer of a corresponding one of the stored documents of the document storage unit 111. The document name field 403 contains an item of document name, which indicates a name of a corresponding stored document of the document storage unit 111. An example of document name in the DM information shown in FIG. 4 is "A.txt" (document name). The operational history field 404 contains an item of operational history, which indicates an identifier of a file describing an operational history of a corresponding one of the stored documents of the document storage unit 111. An example of operational history in the DM information shown in FIG. 4 is "A.xls" (file name). The storage location field 405 contains an item of storage location, which indicates a location of a corresponding one of the stored documents of the document storage unit 111. An example of storage location in the DM information shown in FIG. 4 is "C:¥dir1¥dirA" (path name). In a case in which a group of documents is stored into a WWW server on the Internet, the location of a corresponding one of the stored documents in the DM information shown in FIG. 4 may be described by a specific uniform resource locator (URL) of the server.

In the present embodiment, the operational history file mentioned above is created for each of the stored documents of the document storage unit 111, and each of respective operational history records for one of the stored documents is generated in response to an operation performed on that document by the DO device 130.

FIG. 5 shows an example of the operational history records (or the operational history file) in the first preferred embodiment of the document management apparatus 110. The operational history records are generated by the OH record manager 114, and stored into the OH record storage unit 115. The RD processing unit 116 reads the operational history records from the storage unit 115, in order to perform the matching between the operational history records of the currently processed document and the operational history records of the remaining ones of the stored documents of the document storage unit 111 other than the currently processed document.

As shown in FIG. 5, the operational history file, stored in the OH record storage unit 115, contains a number of operational history records, and there is a one-to-one correspondence between the operational history records of the OH record storage unit 115 and the document processing operations performed by the DO device 130. In the present embodiment, each of the operational history records includes three fields: operator name 411, operation date and time 412, and operation type 413.

In each of the operational history (OH) records stored in the storage unit 115, the operator name field 411 contains an item of operator name, which indicates a name (or user ID) of an operator who has processed a corresponding stored document of the document storage unit 111. An example of operator name in the OH record shown in FIG. 5 is "CCC". The operation date and time field 412 contains an item of operation date and time, which indicates a particular date and time of the end of operation performed by the operator using the DO device 130. An example of operation date and time in the OH record shown in FIG. 5 is "2000/4/1/PM14:00". The operation type field 413 contains an item of operation type, which indicates a type of operation performed by the operator using the DO device 130. Examples of operation type in the OH records shown in FIG. 5 include new recording, overwriting, rename recording, printing and viewing.

As for the operation type described above, the "new recording" operation means to create a new document by using the DO device 130 and store the new document into the document storage unit 111 additionally. The "overwriting" operation means to edit one of the stored documents, read from the document storage unit 111, by using the input unit 131, and overwrite a new version of the corresponding document after the end of the editing to the document storage unit 111. The "rename recording" operation means to rename one of the stored documents, read from the document storage unit 111, and store the corresponding document into the document storage unit 111 with the new document name. The "viewing" operation means to display one of the stored documents on the display unit 132 by reading it from the document storage unit 111. The "printing" operation means to print one of the stored documents read from the document storage unit 111, by using the printer unit 133.

In the present embodiment, at least one item of each of the operational history records may be selected from among the three items of each operational history record to perform the matching between the currently processed document and the remaining ones of the stored documents of the group, for the purpose of extracting related documents from the remaining documents. Further, in the present embodiment, at least one item of each of the operational history records is arbitrarily selected by the operator who processes the current document on the DO device 130, from among the three items of each operational history record. However, each operational history record, stored in the OH record storage unit 115, may include some exceptional items that are not selectable to perform the matching.

Figure 6:
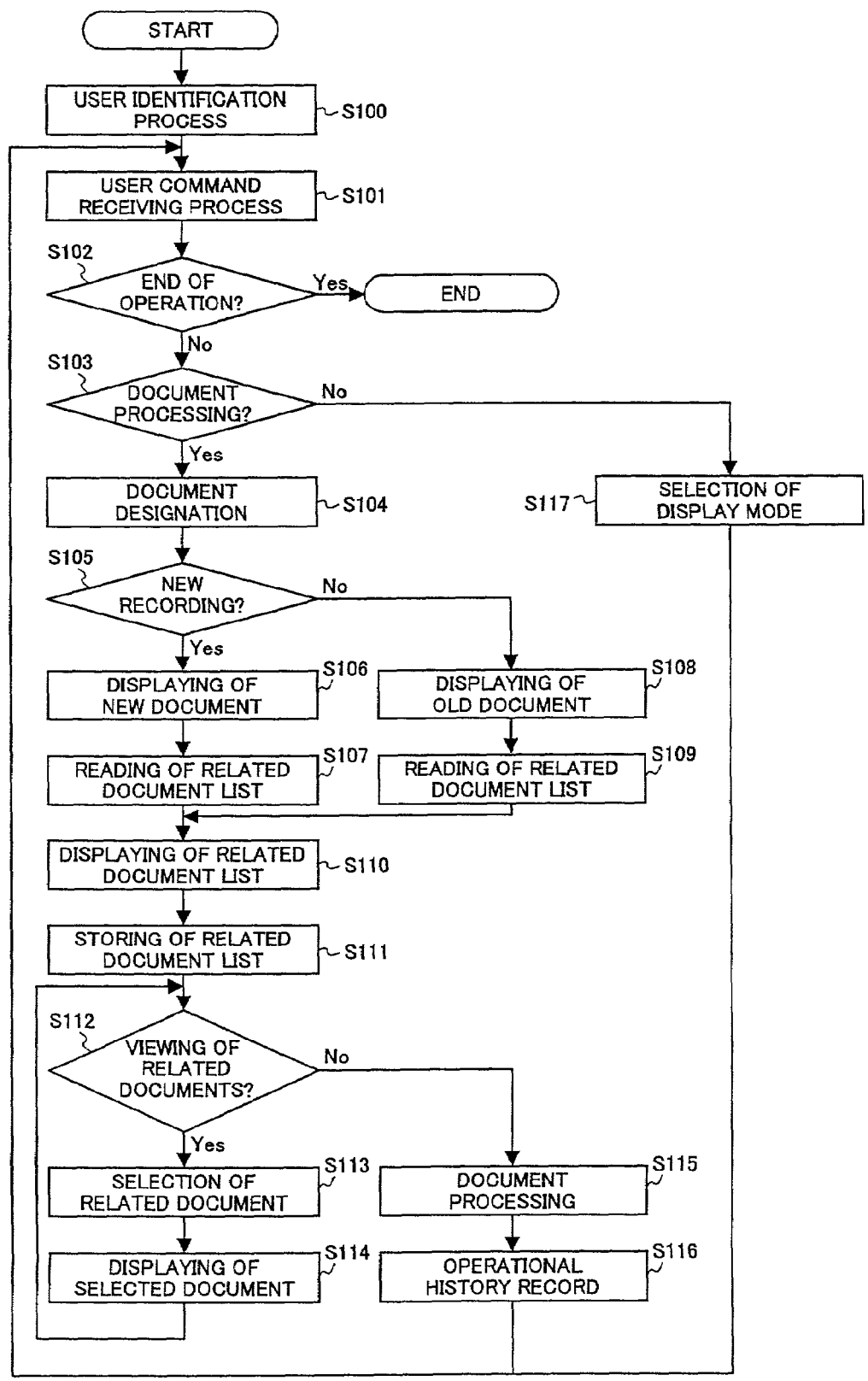
FIG. 6 is a flowchart for explaining operation of the document processing/management system.
Figure 7:
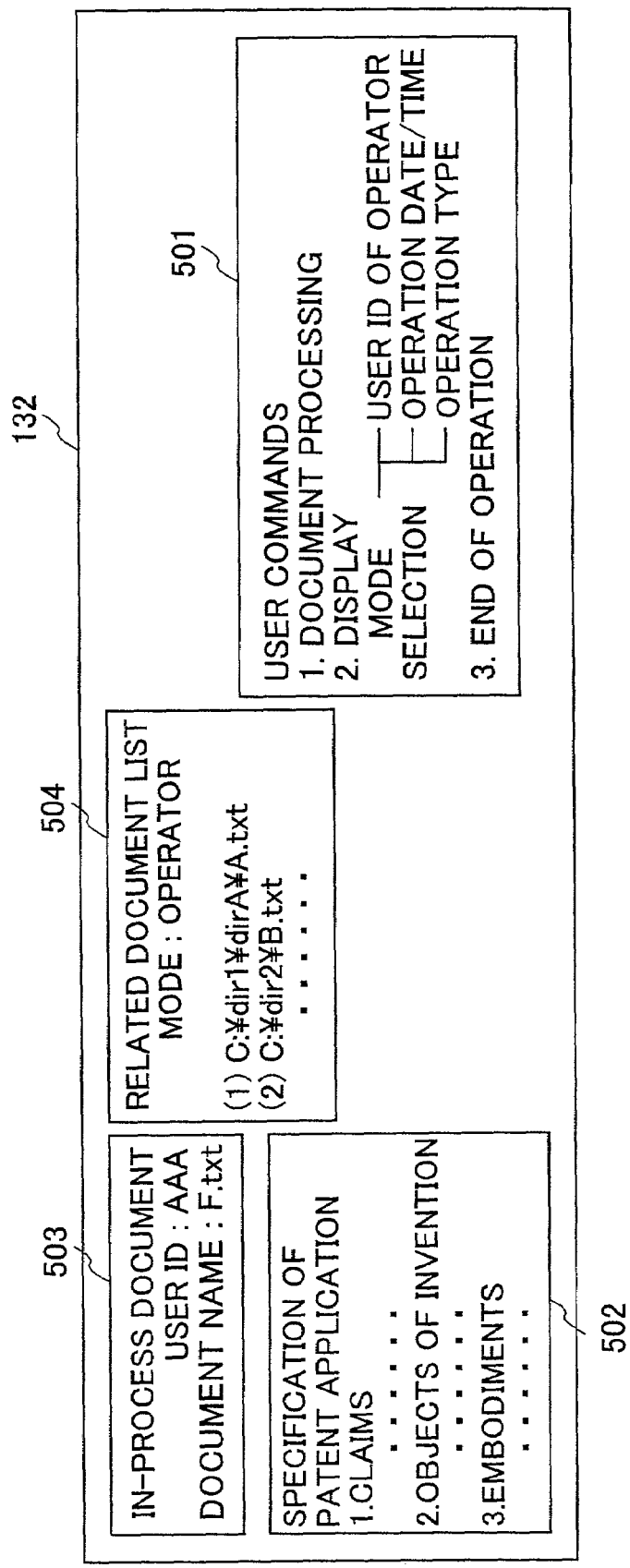
FIG. 7 is a diagram for explaining information of a display screen of a document operation device in the first preferred embodiment of the document management apparatus.
Figure 8:
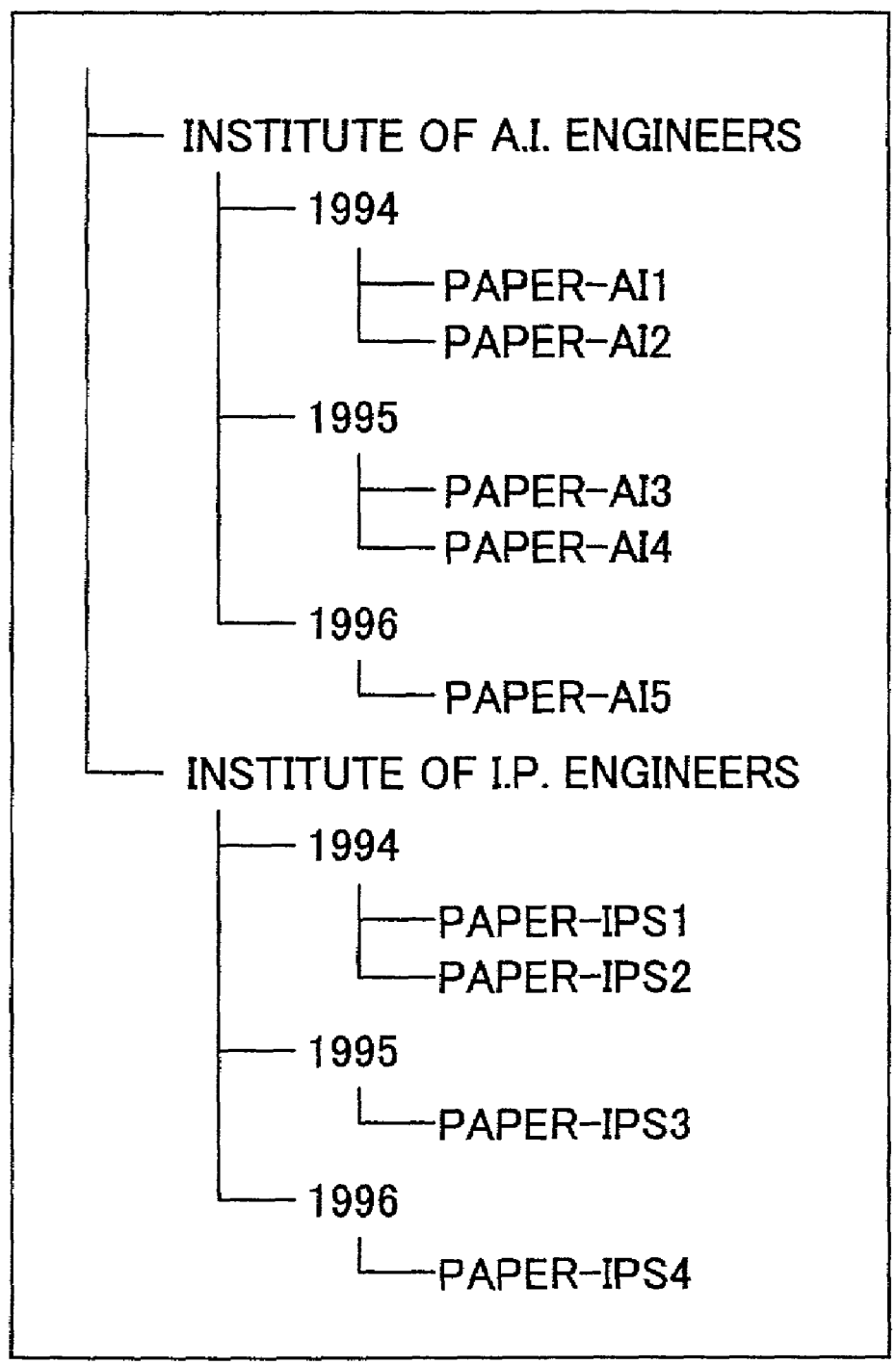
FIG. 8 is a diagram for explaining a hierarchical tree of directories of stored documents displayed by the document operation device in the first preferred embodiment of the document management apparatus.

FIG. 6 shows a main routine performed by the document processing/management system 100. FIG. 7 is a diagram for explaining information of a display screen of the display unit 132 of the document operation device 130 in the first preferred embodiment of the document management apparatus.

As shown in FIG. 7, it is supposed that the display screen of the display unit 132 is divided into four windows: a user command window 501, a document window 502, an in-process document indication window 503, and a related document list window 504. Further, it is supposed that, during operation of the document processing/management system 100, related information is displayed in a corresponding one of these windows of the display unit 132.

As shown in FIG. 6, at a start of the main routine, the DO device 130 performs a user identification process (S100). In the user identification process, the operator is requested to enter a user ID and a password from the input unit 131. The user ID and the password are displayed on the display unit 132. The DO device 130 checks whether the input user ID and password match with those of an authorized user. By this user identification process, it is possible for the system to identify the operator who manipulates the system during the main routine and inhibit an unauthorized person from illegally using the system.

After the step S100 is performed, the DO device 130 performs a user command receiving process (S101). In the user command receiving process, the DO device 130 displays a user command menu in the user command window 501 of the display unit 132 as shown in FIG. 7. The user is requested to select one of commands from the user command menu of the user command window 501. In the present embodiment, the user can select one of three commands: (1) "document processing", (2) "display mode selection", and (3) "end of operation".

After the step S101 is performed, the DO device 130 determines whether the command "end of operation" is selected by the operator (S102). When the result at the step S102 is affirmative, the main routine of FIG. 6 ends and the DO device 130 is set in a waiting condition. Otherwise, the DO device 130 determines whether the command "document processing" is selected by the operator (S103). When the result at the step S103 is affirmative, the control of the DO device 130 is transferred to the next step S104.

In the step S104, the DO device 130 performs a document designation process. In the document designation process, the operator is requested to select one of a new document processing mode and a stored document processing mode. For example, the DO device 130 in the step S104 displays a mode selection menu on the display unit 132 and causes the operator to select one of the two modes using the input device 131.

After the step S104 is performed, the DO device 130 determines whether the new document processing mode is selected by the operator (S105). When the result at the step S105 is affirmative, the control of the DO device 130 is transferred to the next step S106 (the new document processing). Otherwise, the control of the DO device 130 is transferred to the next step S108 (the stored document processing).

In the step S108, the DO device 130 performs an old document displaying process. In the old document displaying process, the operator is requested to designate one of the stored documents of the document storage unit 111 and the DO device 130 displays the designated document in the window 502 of the display unit 132. For example, the DO device 130 displays a hierarchical tree of directories of the stored documents (shown in FIG. 8) on the display unit 132, and the operator is caused to designate one of the stored documents using the input unit 131. To achieve this function, the DO device 130 requests the DM apparatus 110 to send information of the stored documents back to the DO device 130, by transmitting the user ID to the DM apparatus 110. In response to the request, the control unit 120 of the DM apparatus 110 transmits the information of the stored documents to the DO device 130. Hence, the DO device 130 displays the hierarchical tree on the display unit 132, and the operator is caused to designate one of the stored documents using the input unit 131. In the window 503 of the display unit 132, the name of the designated document and the ID of the operator are displayed. In this case, the designated document is the currently processed document.

After the step S108 is performed, the DO device 130 sends a request of reading a related document list to the DM apparatus 110. In response to the request, the DM apparatus 110 performs a related document list reading process (S109). In the related document list reading process, the RD processing unit 116 of the DM apparatus 110 extracts a list of related documents, which are related to the currently processed document, from the remaining ones of the stored documents of the group, based on the results of the matching. The control unit 120 transmits the list of related documents, generated by the RD processing unit 116, from the DM apparatus 110 to the DO device 130. Hence, the DO device 130 displays the list of related documents in the window 504 of the display unit 132.

In the step S106, the DO device 130 performs a new document displaying process. In the new document displaying process, the DO device 130 displays a new document in the window 502 of the display unit 132. In the window 503 of the display unit 132, only the ID of the operator is displayed and a name of the new document is not yet displayed. In this case, the new document is the currently processed document.

After the step S106 is performed, the DO device 130 sends a request of reading a related document list to the DM apparatus 110 together with the user ID. In response to the request, the DM apparatus 110 performs a related document list reading process (S107). In the related document list reading process, the RD processing unit 116 of the DM apparatus 110 reads the correlation between the received user ID and the list of related documents, and generates the list of related documents, which are related to the currently processed document, based on the correlation with the received user ID. The control unit 120 transmits the list of related documents, generated by the RD processing unit 116, from the DM apparatus 110 to the DO device 130. Hence, the DO device 130 displays the list of related documents in the window 504 of the display unit 132.

After the step S107 or the step S109 is performed, the DO device 130 performs a related document list displaying process (S110). In this displaying process, the DO device 130 displays the received list of related documents in the window 504 of the display unit 132. When a vacant related document list is received in the step S107, the DO device 130 displays the display mode selection in the window 504 of the display unit 132.

After the step S110 is performed, the DM apparatus 110 performs a related document list storing process (S111). In this storing process, the DM processing unit 116 of the DM apparatus stores the correlation between the list of related documents and the user ID of the operator into the storage unit 117 together with the list of related documents.

When the list of related documents correlated to the user ID of the current operator is already stored in the storage unit 117, the new version of the related document list is overwritten to the storage unit 117. In other words, only the latest version of the related document list with respect to the user ID of every operator is stored in the RD list storage unit 117. In addition, the latest version of the related document list is transmitted from the DM apparatus 110 to the DO device 130.

After the step S111 is performed, the operator is allowed to view a selected one of the related documents of the list contained in the window 504 of the display unit 132. The DO device 130 determines whether the RD list window 504 of the display unit 132 is activated by the operator using the input unit 131, in order to view one of the related documents (S112). When the result at the step S112 is affirmative, the control of the DO device 130 is transferred to the next step S113. Otherwise, the control of the DO device 130 is transferred to the next step S115.

In the step S113, the DO device 130 performs a related document selection process. In the related document selection process, the operator is requested to select one of the related documents of the list contained in the window 504 of the display unit 132. When the one of the related documents is selected by the operator using the input unit 131, the DO device 130 displays the selected related document on the display unit 132 (S114). To achieve this function, the DO device 130 sends, to the DM apparatus 110, a request of outputting information of the selected related document to the DO device 130. In response to the request, the control unit 120 of the DM apparatus 110 transmits the information of the selected related document to the DO device 130. Hence, the DO device 130 displays the selected related document on the display unit 132, and the operator is allowed to view the selected one of the related document of the list.

After the retrieval of the related document (S114) is performed, the operator is allowed to proceed to the document processing mode. The control of the DO device 130 is transferred to the step S112. If the document window 502 of the display unit 132 is activated by the operator using the input unit 131, then the DO device 130 determines in the step S112 that the RD list window 504 of the display unit 132 is not activated by the operator. The control of the DO device 130 is transferred to the next step S115.

In the step S115, the DO device 130 performs a document processing process. In the document processing process, the operator is requested to select, by using the input unit 131, one of the five operation types: new recording, overwriting, rename recording, printing and viewing. After the step S115 is performed, the DO device 130 performs an operational history record process in cooperation with the DM apparatus 110 (S116). After the step S116 is performed, the control of the DO device 130 is transferred to the step S101.

On the other hand, when the result at the step S103 is negative, it is determined that the command "display mode selection" is selected. The DO device 130 performs a display mode selection process (S117). In the display mode selection process, the operator is requested to select one or more of the display modes: an operator name, an operation date/time, an operation type, and a combination thereof. Either a single display mode or two or more display modes in combination may be selected. After the step S117 is performed, the control of the DO device 130 is transferred to the step S101.

Accordingly, in the present embodiment, by selecting at least one of the display modes in the step S117, at least one item of each operational history record is selected by the operator using the DO device 130 in order for the matching between the currently processed document and the remaining ones of the stored documents.

Figure 9:
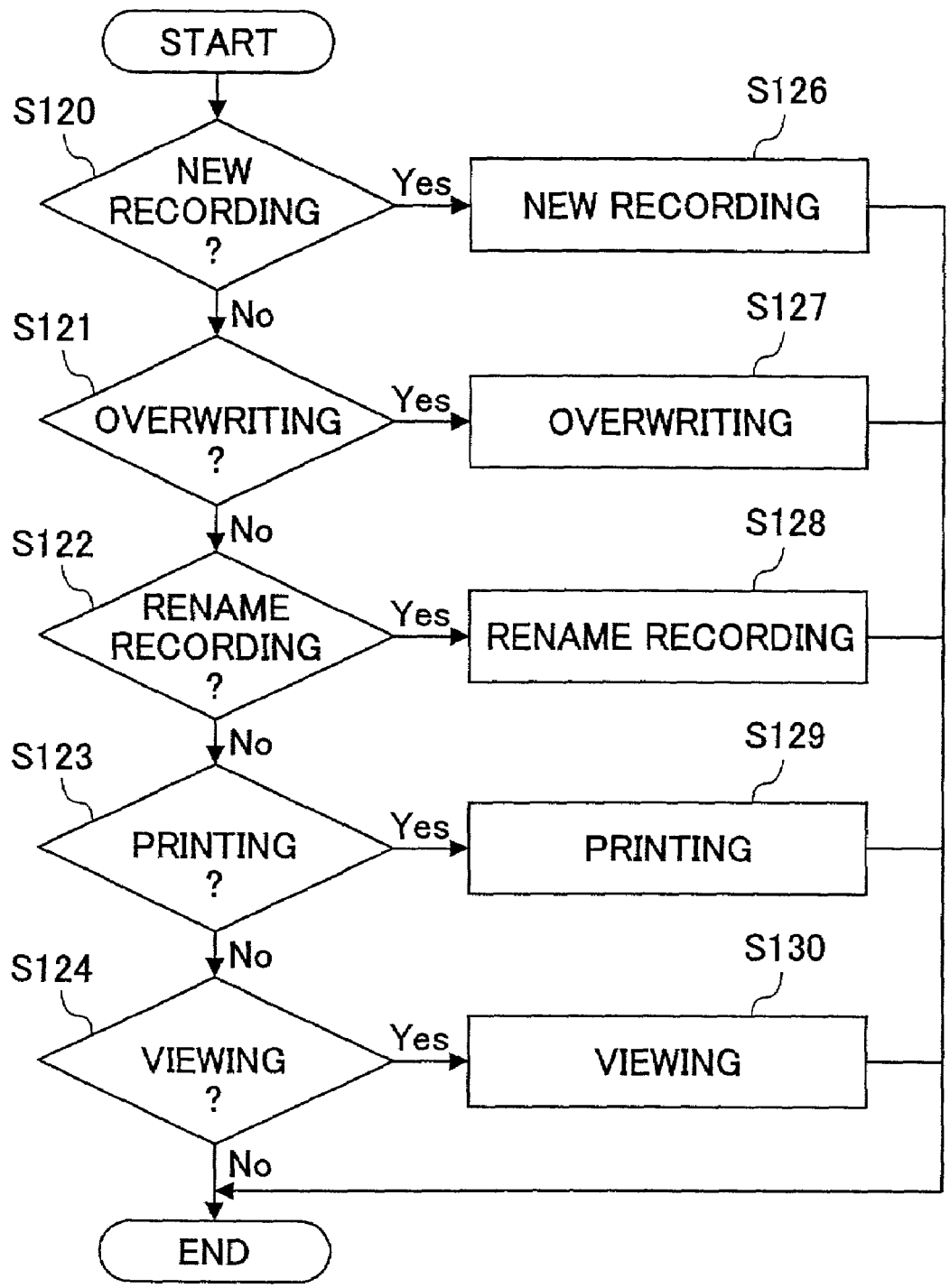
FIG. 9 is a flowchart for explaining an operational history record processing routine executed by the first preferred embodiment of the document management apparatus.

Next, FIG. 9 shows an operational history record process performed by the first preferred embodiment of the document management (DM) apparatus 110. The operational history record process of FIG. 9 corresponds to the step S116 of the main routine of FIG. 6.

At a start of the step S116 in the main routine of FIG. 6, the DO device 130 requests the DM apparatus 110 to perform the operational history record process of FIG. 9.

As shown in FIG. 9, at a start of the operational history record process, the DM apparatus 110 determines whether the new recording operation is selected by the operator (S120). When the result at the step S120 is affirmative, the DM apparatus 110 performs the new recording operation (S126). Otherwise, the control of the DM apparatus 110 is transferred to the next step S121.

In the step S121, the DM apparatus 110 determines whether the overwriting operation is selected by the operator. When the result at the step S121 is affirmative, the DM apparatus 110 performs the overwriting operation (S127). Otherwise, the control of the DM apparatus 110 is transferred to the next step S122.

In the step S122, the DM apparatus 110 determines whether the rename recording operation is selected by the operator. When the result at the step S122 is affirmative, the DM apparatus 110 performs the rename recording operation (S128). Otherwise, the control of the DM apparatus 110 is transferred to the next step S123.

In the step S123, the DM apparatus 110 determines whether the printing operation is selected by the operator. When the result at the step S123 is affirmative, the DM apparatus 110 performs the printing operation (S129). Otherwise, the control of the DM apparatus 110 is transferred to the next step S124.

In the step S124, the DM apparatus 110 determines whether the viewing operation is selected by the operator. When the result at the step S124 is affirmative, the DM apparatus 110 performs the viewing operation (S130). When the result at the step S124 is negative, or when one of the steps S126 to S130 is performed, the process of FIG. 9 ends.

Figure 10:
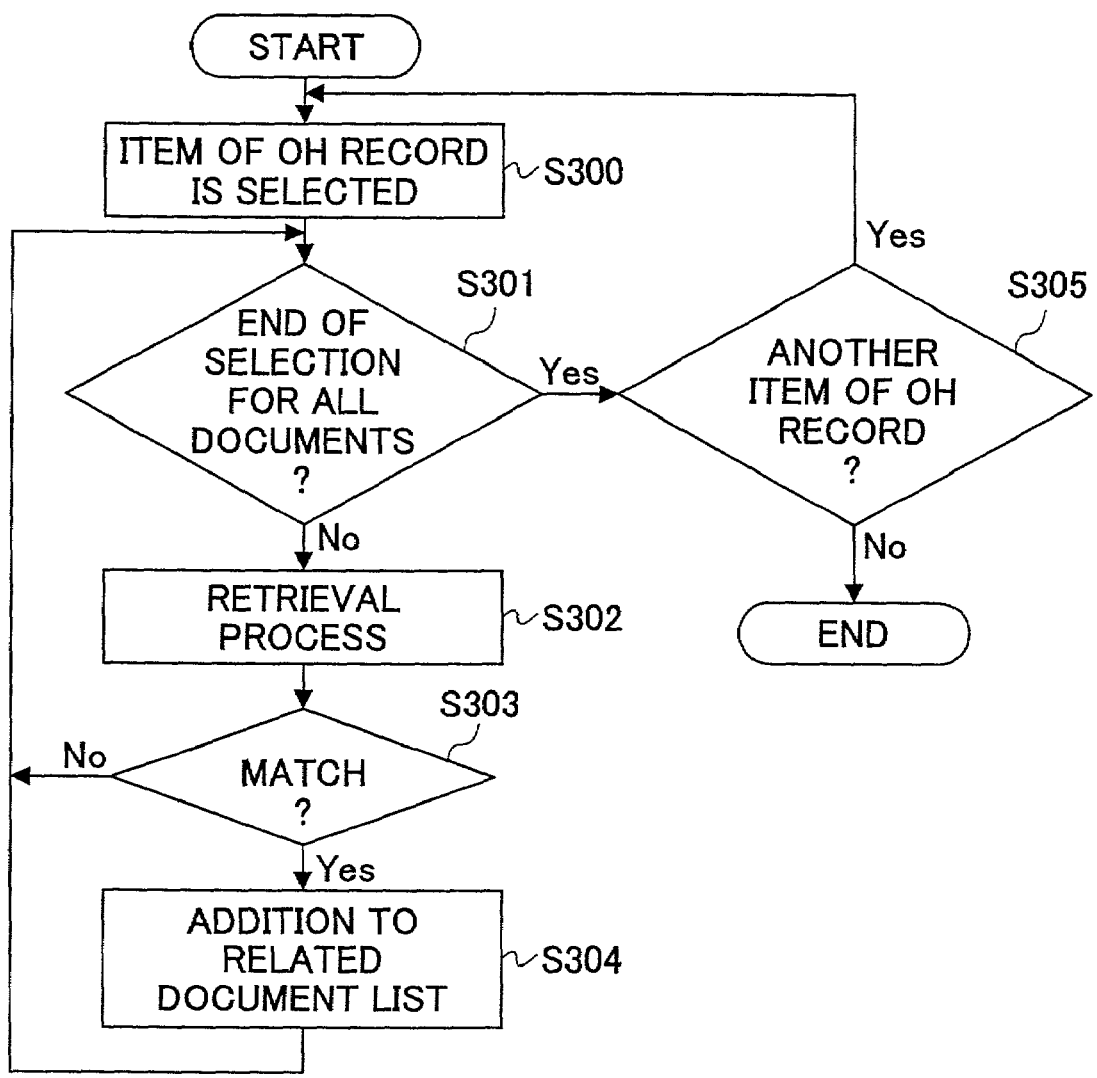
FIG. 10 is a flowchart for explaining a routine of related document retrieval and related document list creation executed by the first preferred embodiment of the document management apparatus.

Next, FIG. 10 shows a routine of related document retrieval and related document list creation executed by the first preferred embodiment of the document management apparatus. The routine of FIG. 10 corresponds to the step S119 in the main routine of FIG. 6.

At a start of the step S119 in the main routine of FIG. 6, the DO device 130 requests the DM apparatus 110 to perform the related document retrieval and related document list creation as in the routine of FIG. 10.

As shown in FIG. 10, at a start of the routine, the RD processing unit 116 of the DM apparatus 110 performs an operational history (OH) record item selection process (S300). In the step S300, the RD processing unit 116 reads the DM information file of the currently processed document from the DM information storage unit 113, and reads the operational history (OH) records of the currently processed document from the OH record storage unit 115 by using the file identifier of the DM information file.

In the step S117 of the main routine of FIG. 6, at least one of the display modes is selected by the operator. Such selected display mode corresponds to the selected item of the OH records of the currently processed document in this case. The RD processing unit 116 in the step S300 reads the selected item of each of the OH records of the currently processed document.

After the step S300 is performed, the RD processing unit 116 determines whether the related document retrieval and related document list creation is done for all of the stored documents of the document storage unit 111 (S301). When the result at the step S301 is negative, the control of the DM apparatus 110 is transferred to the next step S302.

When the result at the step S301 is affirmative, the RD processing unit 116 determines whether another item of the OH records of the currently processed document is selected (S305). When a combination of two or three display modes is selected by the operator in the step S117, there is another selected item. When the result at the step S305 is affirmative, the control of the DM apparatus 110 is transferred to the step S300. Otherwise the routine of FIG. 10 ends.

In the step S302, the RD processing unit 116 retrieves the corresponding item of each of the remaining ones of the stored documents other than the currently processed document. After the step S302 is performed, the RD processing unit 116 determines whether the selected item of the OH records of the currently processed document matches with a corresponding item of each of the OH records of the remaining ones of the stored documents other than the currently processed document (S303).

When the result at the step S303 is affirmative, the RD processing unit 116 performs the related document list creation (S304). In the step S304, the RD processing unit 116 extracts a list of related documents, which are related to the currently processed document, from the remaining ones of the stored documents of the group, based on the results of the matching in the step S302. Namely, when the match occurs, the corresponding document among the remaining ones of the stored documents is added to the list of related documents for the currently processed document in the step S304.

When the result at the step S303 is negative, or when the step S304 is performed, the control of the DM apparatus 110 is transferred to the step S301. The above procedures are repeated until the result at the step S301 is affirmative.

Accordingly, the list of related documents is created as a result of the routine of FIG. 10. As described earlier, after the list of related documents is produced, the DM processing unit 116 stores in the step S111 the correlation between the list of related documents and the user ID of the operator into the storage unit 117 together with the list of related documents.

A description will be given of the related document retrieval and related document list creation processes for each of the display modes.

When the operation date/time mode is selected by the operator in the step S117, the following processes are performed in the present embodiment. In the step S303, the RD processing unit 116 determines whether the operation date/time item of the OH records of the currently processed document matches with a corresponding operation date/time item of each of the OH records of the remaining documents. To simplify the determination of the matching, in the present embodiment, the time value of the operation date/time item of the OH records is neglected. When the operation date value of the currently processed document matches with that of the remaining documents, it is determined that the match occurs. Alternatively, when a difference in the operation date between the currently processed document and the remaining documents is smaller than a reference value, it may be determined that the match occurs.

In the above-mentioned processes, all of the OH records of the currently processed document are subjected to the determination of the matching. Alternatively, only the latest operation date (or a given number of the newer operation dates, the oldest operation date, or a given number of the older operation dates) among the OH records of the currently processed document may be subjected to the determination of the matching.

When the user ID mode is selected by the operator in the step S117, the following processes are performed in the present embodiment. In the step S303, the RD processing unit 116 determines whether the user ID item of the OH records of the currently processed document matches with a corresponding user ID item of each of the OH records of the remaining ones of the stored documents. In the present embodiment, when the user ID item of the currently processed document matches with that of the remaining documents, it is determined that the match occurs.

In the above-mentioned processes, all of the OH records of the currently processed document are subjected to the determination of the matching. Alternatively, only the latest operation type item (or a given number of the newer operation type items, the oldest operation type item, or a given number of the older operation type items) among the OH records of the currently processed document may be subjected to the determination of the matching.

When the operation type mode is selected by the operator in the step S117, the following processes are performed in the present embodiment. In the step S303, the RD processing unit 116 determines whether the operation type item of the OH records of the currently processed document matches with a corresponding operation type item of each of the OH records of the remaining ones of the stored documents. In the present embodiment, when the operation type item of the currently processed document matches with that of the remaining documents, it is determined that the match occurs.

In the above-mentioned processes, all of the OH records of the currently processed document are subjected to the determination of the matching. Alternatively, only the latest operation date (or a given number of the newer operation dates, the oldest operation date, or a given number of the older operation dates) among the OH records of the currently processed document may be subjected to the determination of the matching.

Similarly, when a combination of two or more display modes is selected by the operator in the step S117, the processes which are essentially the same as those described above are performed in the present embodiment. A description thereof will be omitted.

In the above-described embodiment, a related document list, which is created by the DM apparatus 110, is transmitted to the DO device 130 so that the related document list is displayed on the display unit 132, in order to assist the operator who processes the current document on the DO device 130. It is readily understood that the related document list may be also used to facilitate the managing of the stored documents of the document storage unit 111 by the DM apparatus 110.

Next, a description will be given of a second preferred embodiment of the document management apparatus, the related document extracting method, and the document processing assist method of the present invention with reference to FIG. 11 through FIG. 14.

In the present embodiment, the document management apparatus is configured in the same manner as the DM apparatus 110 in the document processing/management system 100 of FIG. 1. The elements that are essentially the same as corresponding elements in FIG. 1 are designated by the same reference numerals, and a description thereof will be omitted.

In the DM apparatus 110 of the present embodiment, the document manager 112 manages the stored documents of the document storage unit 111 as a relational type database.

FIG. 11 shows an example of the document management (DM) information in the DM apparatus 110 of the present embodiment. The DM information is generated by the document manager 112 and stored into the DM information storage unit 113. The document manager 112 reads the DM information from the storage unit 113, in order to manage the stored documents of the document storage unit 111.

As shown in FIG. 11, the DM information, stored in the storage unit 113, is configured into a number of DM information records, and there is a one-to-one correspondence between the DM information records of the storage unit 113 and the stored documents of the document storage unit 111. In the present embodiment, each of the DM information records includes six fields: document kind 601, writer name 602, document name 603, operational history 604, storage location 605, and related document (RD) indication list 606.

In each of the DM information records stored in the storage unit 113, the document kind field 601 contains an item of document kind, which indicates a kind of a corresponding stored document of the document storage unit 111. The writer name field 602 contains an item of writer name, which indicates a name of a writer of a corresponding one of the stored documents of the document storage unit 111. The document name field 603 contains an item of document name, which indicates a name of a corresponding stored document of the document storage unit 111. The operational history field 604 contains an item of operational history, which indicates an identifier of a file describing an operational history of a corresponding one of the stored documents of the document storage unit 111. The storage location field 605 contains an item of storage location, which indicates a location of a corresponding one of the stored documents of the document storage unit 111. In a case in which a group of documents is stored into a WWW server on the Internet, the location of a corresponding one of the stored documents in the DM information shown in FIG. 4 may be described by a specific uniform resource locator (URL) of the server.

Further, in each of the DM information records stored in the storage unit 113, the RD indication list field 606 contains an item of RD indication list, which indicates a list of storage locations of related documents among the stored documents of the document storage unit 111, the related documents being subjected to either copying operations to the subject document or reference accesses from the subject document. In a case in which a group of documents is stored into a WWW server on the Internet, the storage location of each of the related documents contained in the RD indication list is described by a hyperlink. The DM apparatus 110 automatically generates this RD indication list for each of the stored documents of the document storage unit 111.

In the present embodiment, the operational history file is created for each of the stored documents of the document storage unit 111, and each of respective operational history records for one of the stored documents is generated in response to an operation performed on that document by the DO device 130.

FIG. 12 shows an example of the operational history (OH) records (or the operational history file) in the DM apparatus 110 of the present embodiment. The operational history (OH) records are generated by the OH record manager 114, and stored into the OH record storage unit 115. The RD processing unit 116 reads the OH records from the storage unit 115, in order to perform the matching between the OH records of the currently processed document and the OH records of the remaining ones of the stored documents of the document storage unit 111 other than the currently processed document.

As shown in FIG. 12, the operational history (OH) file, stored in the storage unit 115, contains a number of operational history (OH) records, and there is a one-to-one correspondence between the OH records of the storage unit 115 and the document processing operations performed by the DO device 130. In the present embodiment, each of the OH records includes five fields: operator name 611, operation type 612, operation time period 613, number of reference accesses 614, and amount of copied data 615.

In each of the operational history (OH) records stored in the storage unit 115, the operator name field 611 contains an item of operator name, which indicates a name (or user ID) of an operator who has processed a corresponding stored document of the document storage unit 111. The operation type filed 612 contains an item of operation type, which indicates a type of operation performed by the operator using the DO device 130. Examples of operation type in the OH records shown in FIG. 12 include new recording, overwriting, rename recording, printing and viewing. These examples of operation type are the same as those corresponding examples of the first preferred embodiment described above.

The operation time period field 613 contains an item of operation time period, which indicates a start date/time and an end date/time of operation performed by the operator using the DO device 130. An example of operation time period in the OH record shown in FIG. 12 is "2000/4/1/PM14:00–2000/4/1/PM14:05".

The reference access number field 614 contains an item of reference access number, which indicates the number of reference accesses from the subject document to other related documents by switching of the document window on the display unit 132, as well as a list of file names (or path names) of the related documents. An example of reference access number in the OH record shown in FIG. 12 is "4, C:¥dir1¥F.txt".

The copied data amount field 615 contains an item of copied data amount, which indicates the amount of data copied from other related documents to the subject document by switching of the document window on the display unit 132, as well as a list of file names (or path names) of the related documents. An example of copied data amount in the OH record shown in FIG. 12 is "35, C: ¥dir1¥F.txt".

In the present embodiment, the RD processing unit 116 includes a document relation (DR) estimating unit that calculates an estimated degree of relation between the currently processed document and each of the remaining ones of the stored documents of the document storage unit 111 by using at least one item among the operation time period item, the reference access number item and the copied data amount item of the OH records of the currently processed document. The estimated degree of relation, calculated by the DR estimating unit, is used for the RD processing unit 116 to extract the list of related documents from the remaining ones of the stored documents of the document storage unit 111.

In the present embodiment, at least one item of each of the operational history (OH) records may be selected from among the three items: the operation time period, the reference access number and the copied data amount, in order to perform the matching between the currently processed document and the remaining ones of the stored documents of the group, for the purpose of extracting the list of related documents from the remaining documents. Further, in the present embodiment, at least one item of each of the OH records is arbitrarily selected by the operator who processes the current document on the DO device 130. However, each OH record, stored in the storage unit 115, may include some exceptional items that are not selectable to perform the matching.

Figure 13:
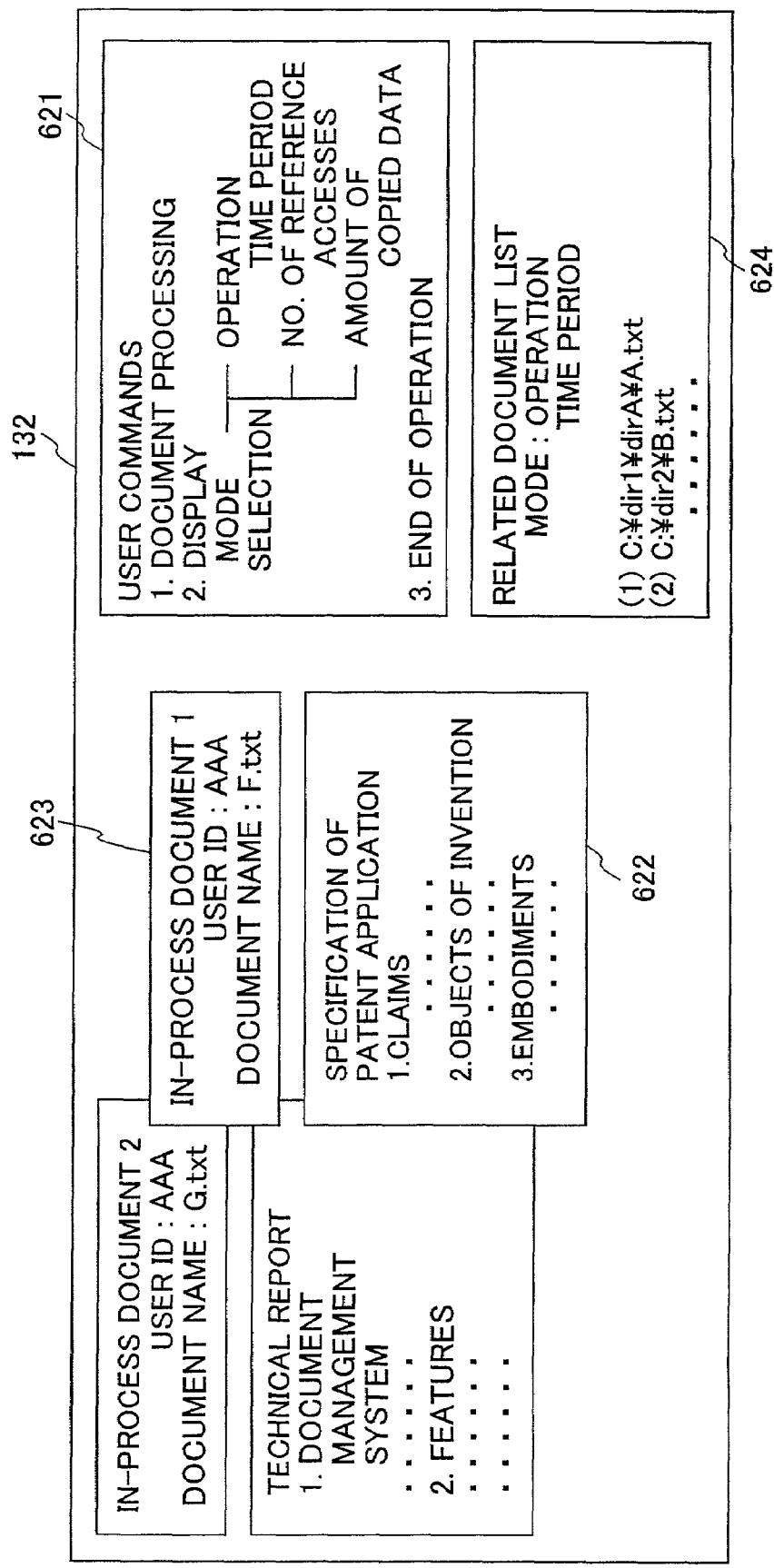
FIG. 13 is a diagram for explaining information of a display screen of the document operation device in the second preferred embodiment of the document management apparatus.

In the present embodiment, the main routine performed by the document processing/management system 100 is essentially the same as the main routine of the first preferred embodiment shown in FIG. 6. FIG. 13 shows information of a display screen of the display unit 132 of the document operation (DO) device 130 in the second preferred embodiment.

As shown in FIG. 13, it is supposed that the display screen of the display unit 132 is divided into four windows: a user command window 621, a document window 622, an in-process document indication window 623, and a related document list window 624. Two or more of the stored documents from the document storage unit 111 may be displayed, and in such cases, a corresponding number of the document windows 622 and in-process document indication windows 623 may appear on the display screen of the display unit 132. Further, it is supposed that, during operation of the document processing/management system 100, related information is displayed in a corresponding one of these windows of the display unit 132.

Similar to the flowchart of FIG. 6, at a start of the main routine, the DO device 130 of the present embodiment performs a user identification process (S100). In the user identification process, the operator is requested to enter a user ID and a password from the input unit 131.

After the step S100 is performed, the DO device 130 performs a user command receiving process (S01). In the user command receiving process, the DO device 130 displays a user command menu in the user command window 621 of the display unit 132 as shown in FIG. 13. The user is requested to select one of the three commands: (1) "document processing", (2) "display mode selection", and (3) "end of operation", from the user command menu of the user command window 621.

After the step S101 is performed, the DO device 130 determines whether the command "end of operation" is selected by the operator (S102). When the result at the step S102 is affirmative, the main routine of FIG. 6 ends and the DO device 130 is set in a waiting condition. Otherwise, the DO device 130 determines whether the command "document processing" is selected by the operator (S103). When the result at the step S103 is affirmative, the control of the DO device 130 is transferred to the next step S104.

In the step S104, the DO device 130 performs a document designation process. In the document designation process, the operator is requested to select one of the new document processing mode and the stored document processing mode. For example, the DO device 130 in the step S104 displays a mode selection menu on the display unit 132 and causes the operator to select one of the two modes using the input device 131.

After the step S104 is performed, the DO device 130 determines whether the new document processing mode is selected by the operator (S105). When the result at the step S105 is affirmative, the control of the DO device 130 is transferred to the next step S106 (the new document processing). Otherwise, the control of the DO device 130 is transferred to the next step S108 (the stored document processing).

In the step S108, the DO device 130 performs an old document displaying process. In the old document displaying process, the DO device 130 displays the hierarchical tree on the display unit 132, and the operator is caused to designate one of the stored documents using the input unit 131. In the window 623 of the display unit 132, the name of the designated document and the ID of the operator are displayed as shown in FIG. 13.

As shown in FIG. 13, two of the stored documents from the document storage unit 111 may be displayed, and in this case, two document windows 622 and two in-process document indication windows 623 appear on the display screen of the display unit 132. One of the two documents can be designated by the operator by activating the corresponding window of the display screen using the input unit 131. In this case, the designated document that is activated by the operator using the input unit 131 is the currently processed document.

After the step S108 is performed, the DO device 130 sends a request of reading a related document list to the DM apparatus 110. In response to the request, the DM apparatus 110 performs a related document list reading process (S109). In the related document list reading process, the RD processing unit 116 of the DM apparatus 110 extracts a list of related documents, which are related to the currently processed document, from the remaining ones of the stored documents of the group, based on the results of the matching. The control unit 120 transmits the list of related documents, generated by the RD processing unit 116, from the DM apparatus 110 to the DO device 130. Hence, the DO device 130 displays the list of related documents in the window 624 of the display unit 132.

In the step S106, the DO device 130 performs a new document displaying process. In the new document displaying process, the DO device 130 displays a new document in the window 622 of the display unit 132. In the window 623 of the display unit 132, only the user ID of the operator is displayed and a name of the new document is not yet displayed. In this case, the new document is the currently processed document.

After the step S106 is performed, the DO device 130 sends a request of reading a related document list to the DM apparatus 110 together with the user ID. In response to the request, the DM apparatus 110 performs a related document list reading process (S107). In the related document list reading process, the RD processing unit 116 of the DM apparatus 110 reads the correlation between the received user ID and the list of related documents, and generates the list of related documents, which are related to the currently processed document, based on the correlation with the received user ID. The control unit 120 transmits the list of related documents, generated by the RD processing unit 116, from the DM apparatus 110 to the DO device 130. Hence, the DO device 130 displays the list of related documents in the window 624 of the display unit 132.

After the step S107 or the step S109 is performed, the DO device 130 performs a related document list displaying process (S110). In this displaying process, the DO device 130 displays the received list of related documents in the window 624 of the display unit 132. When a vacant related document list is received in the step S107, the DO device 130 displays only the display mode selection in the window 624 of the display unit 132.

After the step S110 is performed, the DM apparatus 110 performs a related document list storing process (S111). In this storing process, the DM processing unit 116 of the DM apparatus stores the correlation between the list of related documents and the user ID of the operator into the storage unit 117 together with the list of related documents.

When the list of related documents correlated to the user ID of the current operator is already stored in the storage unit 117, the new version of the related document list is overwritten to the storage unit 117. In other words, only the latest version of the related document list with respect to the user ID of every operator is stored in the R/D list storage unit 117. In addition, the latest version of the related document list is transmitted from the DM apparatus 110 to the DO device 130.

After the step S111 is performed, the operator is allowed to view a selected one of the related documents of the list contained in the window 624 of the display unit 132. The DO device 130 determines whether the RD list window 624 of the display unit 132 is activated by the operator using the input unit 131, in order to view one of the related documents (S112). When the result at the step S112 is affirmative, the control of the DO device 130 is transferred to the next step S113. Otherwise, the control of the DO device 130 is transferred to the next step S115.

In the step S113, the DO device 130 performs a related document selection process. In the related document selection process, the operator is requested to select one of the related documents of the list contained in the window 624 of the display unit 132. When the one of the related documents is selected by the operator using the input unit 131, the DO device 130 displays the selected related document on the display unit 132 (S114). To achieve this function, the DO device 130 sends, to the DM apparatus 110, a request of outputting information of the selected related document to the DO device 130. In response to the request, the control unit 120 of the DM apparatus 110 transmits the information of the selected related document to the DO device 130. Hence, the DO device 130 displays the selected related document on the display unit 132, and the operator is allowed to view the selected one of the related document of the list.

After the retrieval of the related document (S114) is performed, the operator is allowed to proceed to the document processing mode. The control of the DO device 130 is transferred to the step S112. If the document window 622 of the display unit 132 is activated by the operator using the input unit 131, then the DO device 130 determines in the step S112 that the RD list window 624 of the display unit 132 is not activated by the operator. The control of the DO device 130 is transferred to the next step S115.

In the step S115, the DO device 130 performs a document processing process. In the document processing process, the operator is requested to select, by using the input unit 131, one of the five operation types: new recording, overwriting, rename recording, printing and viewing. After the step S115 is performed, the DO device 130 performs an operational history record process in cooperation with the DM apparatus 110 (S116). After the step S116 is performed, the control of the DO device 130 is transferred to the step S101.

On the other hand, when the result at the step S103 is negative, it is determined that the command "display mode selection" is selected. The DO device 130 performs a display mode selection process (S117). In the display mode selection process, the operator is requested to select one or more of the display modes: the operation time period, the reference access number, the copied data amount, and a combination thereof. Either a single display mode or two or more display modes in combination may be selected. After the step S117 is performed, the control of the DO device 130 is transferred to the step S101.

Accordingly, in the present embodiment, by selecting at least one of the display modes in the step S117, at least one item of each operational history record is selected by the operator using the DO device 130 in order for the matching between the currently processed document and the remaining documents.

The DM apparatus 110 of the present embodiment performs an operational history record process that is essentially the same as that of the previous embodiment shown in FIG. 9. The operational history record process of FIG. 9 corresponds to the step S116 of the main routine of FIG. 6.

Figure 14:
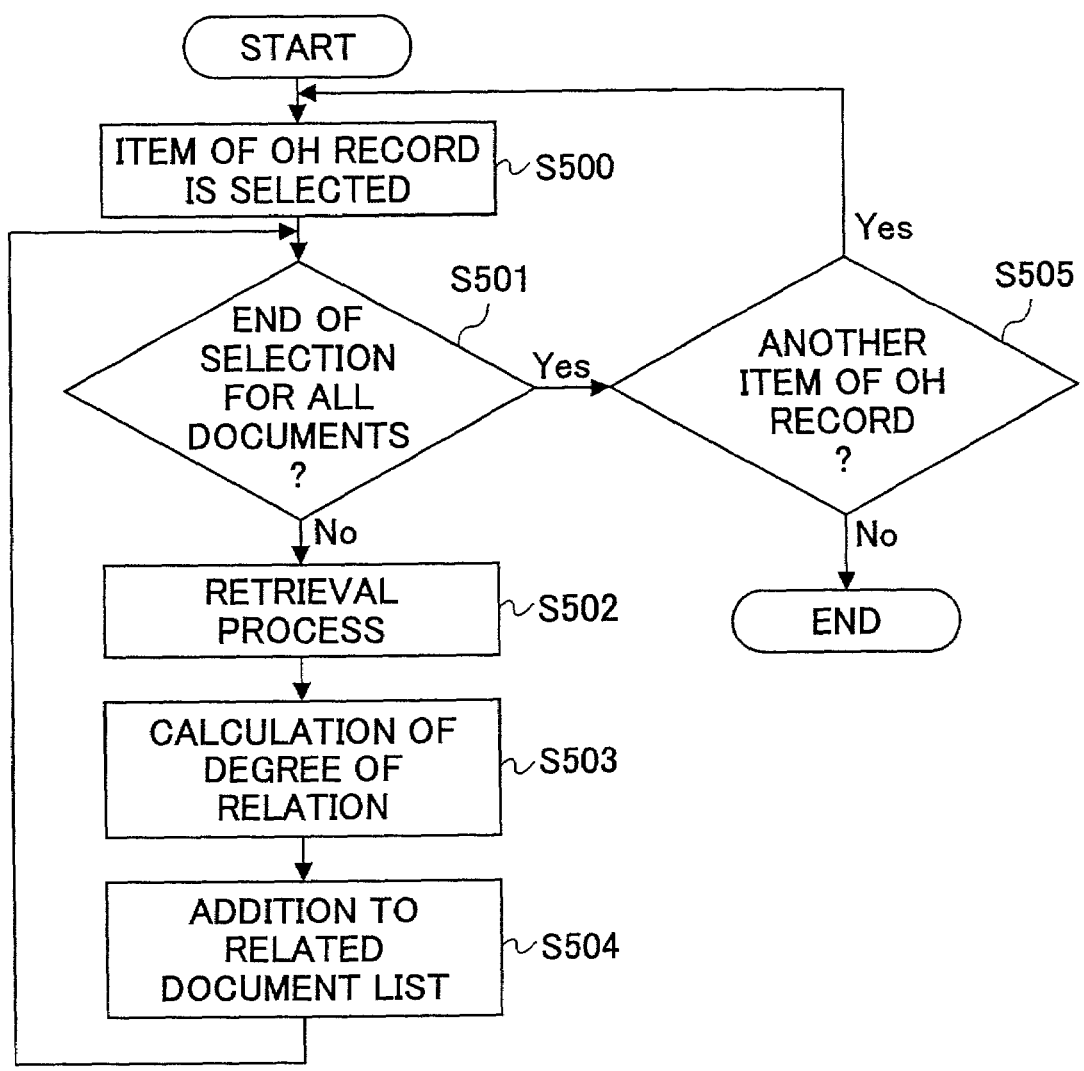
FIG. 14 is a flowchart for explaining a routine of related document retrieval and related document list creation executed by the second preferred embodiment of the document management apparatus.

Next, FIG. 14 shows a routine of related document retrieval and related document list creation executed by the DM apparatus 110 of the present embodiment. The routine of FIG. 14 corresponds to the step S119 in the main routine of FIG. 6. At a start of the step S119 in the main routine of FIG. 6, the DO device 130 requests the DM apparatus 110 to perform the related document retrieval and related document list creation as in the routine of FIG. 14.

As shown in FIG. 14, at a start of the routine, the RD processing unit 116 of the DM apparatus 110 performs an operational history (OH) record item selection process (S500). In the step S500, the RD processing unit 116 reads the DM information file of the currently processed document from the DM information storage unit 113, and reads the operational history (OH) records of the currently processed document from the OH record storage unit 115 by using the file identifier of the DM information file.

In the step S117 of the main routine of FIG. 6, at least one of the display modes is selected by the operator. Such selected display mode corresponds to the selected item of the OH records of the currently processed document in this case. The RD processing unit 116 in the step S500 reads the selected item of each of the OH records of the currently processed document.

After the step S500 is performed, the RD processing unit 116 determines whether the related document retrieval and related document list creation is done for all of the stored documents of the document storage unit 111 (S501). When the result at the step S501 is negative, the control of the DM apparatus 110 is transferred to the next step S502.

When the result at the step S501 is affirmative, the RD processing unit 116 determines whether another item of the OH records of the currently processed document is selected (S505). When a combination of two or three display modes is selected by the operator in the step S117, there is another selected item. When the result at the step S505 is affirmative, the control of the DM apparatus 110 is transferred to the step S500. Otherwise the routine of FIG. 14 ends.

In the step S502, the RD processing unit 116 extracts the corresponding item of each of the remaining ones of the stored documents other than the currently processed document. After the step S502 is performed, the RD processing unit 116 calculates an estimated degree of relation between the currently processed document and the remaining documents by using the selected item of the OH records of the currently processed document (S503). In the step S503, the RD processing unit 116 determines whether the selected item of the OH records of the currently processed document matches with a corresponding item of each of the OH records of the remaining documents based on the estimated degrees of relation calculated for the remaining documents.

After the step S503 is performed, the RD processing unit 116 performs the related document list creation (S504). In the step S504, the RD processing unit 116 extracts a list of related documents, which are related to the currently processed document, from the remaining documents of the group, based on the estimated degrees of relation obtained in the step S503. Namely, in the list of related documents, the file names (or path names) of the related documents are sorted in ascending order of the estimated degrees of relation calculated in the step S503.

After the step S504 is performed, the control of the DM apparatus 110 is transferred to the step S501. The above procedures are repeated until the result at the step S501 is affirmative.

Accordingly, the list of related documents is created as a result of the routine of FIG. 14. As described earlier, after the list of related documents is produced, the DM processing unit 116 stores, in the step S111 of the main routine, the correlation between the list of related documents and the user ID of the operator into the storage unit 117 together with the list of related documents.

A description will be given of the related document retrieval and related document list creation processes for each of the display modes.

When the operation time period mode is selected by the operator in the step S117, the following processes are performed in the present embodiment. In the step S503, the RD processing unit 116 calculates the estimated degree of relation by the number of seconds for which the operation time period item of the OH records of the currently processed document overlaps with a corresponding operation time period item of each of the OH records of the remaining documents. To simplify the determination of the matching, in the present embodiment, the number of seconds calculated is divided by 3600 (i.e., 3600 sec.=1 hour), and the resulting value is used as the normalized value that ranges from 0 to 1. This normalized value is used for the determination of the matching. If the value resulted by the division exceeds 1, the value is truncated to be equal to 1. If there is no overlapping time period between the currently processed document and the remaining documents, the resulting value is equal to 0.

In the above-mentioned processes, it is possible that, if a related document (its file name or path name) is contained in the RD indication list 606 of the DM information record corresponding to the currently processed document, the estimated degree of relation calculated is multiplied by a given constant (for example, 1.2), and the resulting value is used for the determination of the matching. By taking such measures, the accuracy of the related document retrieval can be increased.

When the reference access number mode is selected by the operator in the step S117, the following processes are performed in the present embodiment. In the step S503, the RD processing unit 116 calculates a sum of the numbers of reference accesses in the reference access number item 614 of the OH records for each of the remaining documents which contains the file names in the related document list that match with the item 614 of the OH records of the currently processed document. To simplify the determination of the matching, in the present embodiment, the sum of the numbers of reference accesses calculated is divided by 10, and the resulting value is used as the normalized value that ranges from 0 to 1. This normalized value is used for the determination of the matching. If the value resulted by the division exceeds 1, the value is truncated to be equal to 1. If there is no match of the file names between the currently processed document and the remaining documents, the resulting value is equal to 0.

In the above-mentioned processes, if a related document (its file name or path name) is contained in the RD indication list 606 of the DM information record corresponding to the currently processed document, the estimated degree of relation calculated is multiplied by a given constant (for example, 1.2), and the resulting value is used for the determination of the matching. By taking such measures, the accuracy of the related document retrieval can be increased.

When the copied data amount mode is selected by the operator in the step S117, the following processes are performed in the present embodiment. In the step S503, the RD processing unit 116 calculates a sum of the amounts of copied data in the copied data amount item 615 of the OH records for each of the remaining documents which contains the file names in the related document list that match with the item 615 of the OH records of the currently processed document. To simplify the determination of the matching, in the present embodiment, the sum of the amounts of copied data calculated is divided by 800 (i.e., 800 words=1 page), and the resulting value is used as the normalized value that ranges from 0 to 1. This normalized value is used for the determination of the matching. If the value resulted by the division exceeds 1, the value is truncated to be equal to 1. If there is no match of the file names between the currently processed document and the remaining documents, the resulting value is equal to 0.

In the above-mentioned processes, if a related document (its file name or path name) is contained in the RD indication list 606 of the DM information record corresponding to the currently processed document, the estimated degree of relation calculated is multiplied by a given constant (for example, 1.2), and the resulting value is used for the determination of the matching. By taking such measures, the accuracy of the related document retrieval can be increased.

Similarly, when a combination of two or more display modes is selected by the operator in the step S117, the processes which are essentially the same as those described above are performed in the present embodiment. A description thereof will be omitted.

In the above-described embodiment, a related document list, which is created by the DM apparatus 110, is transmitted to the DO device 130 so that the related document list is displayed on the display unit 132, in order to assist the operator who processes the current document on the DO device 130. It is readily understood that the related document list may be also used to facilitate the managing of the stored documents of the document storage unit 111 by the DM apparatus 110.

The document management apparatus and related document extracting method of the present embodiment are effective in automatically extracting the related documents, related to the currently processed document, from the group of stored documents. It is unnecessary for the present embodiment to perform the preparatory tasks, such as the document classification, the document relation determination and keyword inputting as in the conventional methods.

Figure 15:
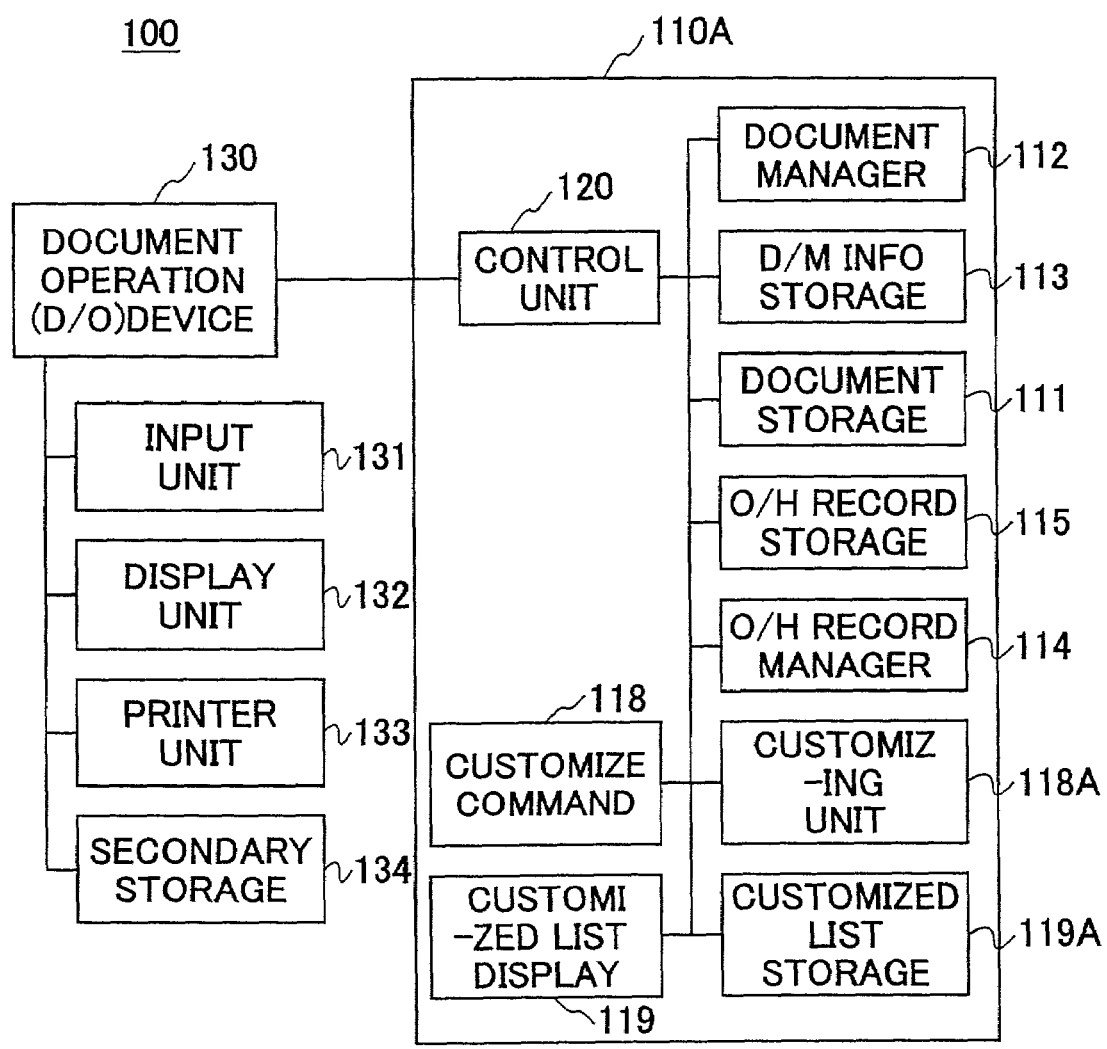
FIG. 15 is a block diagram of a third preferred embodiment of the document management apparatus of the invention.

Next, FIG. 15 shows a third preferred embodiment of the document management apparatus of the invention. In FIG. 15, the elements that are essentially the same as corresponding elements in FIG. 1 are designated by the same reference numerals, and a description thereof will be omitted.

Similar to the previous embodiment of FIG. 1, the document processing/management system 100 generally includes a document management (DM) apparatus 110A and the document operation (DO) device 130. The DO device 130 is connected to the DM apparatus 110A. The DM apparatus 110A manages a group of documents stored in the document storage unit 111. The DO device 130 is provided for an operator to process any of the stored documents in the DM apparatus 110A.

The DO device 130 in the present embodiment is essentially the same as that of the previous embodiment of FIG.

1, and it generally includes the input unit 131, the display unit 132, the printer unit 133, and the secondary storage unit 134.

In FIG. 15, a single DO device 130 that is connected to the DM apparatus 110A is shown. Alternatively, a plurality of DO devices 130, which are similar to the DO device 130 shown in FIG. 15, may be connected to the DM apparatus 110A.

In the document management (DM) apparatus 110A of FIG. 15, the document storage unit 111 stores the group of documents. The document manager 112 manages the group of documents stored in the document storage unit 111. The DM information storage unit 113 stores DM information, which is used by the document manager 112 when managing the group of the stored documents of the document storage unit 111. The operational history (OH) record manager 114 generates and manages respective operational history records which are related to any of the stored documents of the document storage unit 111. The OH record storage unit 115 stores the respective OH records generated by the OH record manager 114.

Further, in the document management (DM) apparatus 110A of FIG. 1, a customizing unit 118A, a customized list storage unit 119A, and the control unit 120 are provided. The control unit 120 controls the entire operation of the DM apparatus 110A and the respective operations of the above elements 111–115, 118A and 119A.

The customizing unit 118A classifies the stored documents of the document storage unit 111 based on the OH records stored in the storage unit 115, and generates a customized list of the OH records based on the results of the document classification. The customized list storage unit 119A stores the customized list of the OH records generated by the customizing unit 118A.

Furthermore, the DM apparatus 110A may be provided with a customize command unit 118 and a customized list display unit 119. The customize command unit 118 sends a customize method setting command to the customizing unit 118A, and how the customized list of operational history (OH) records should be generated is set by the customizing unit 118A in accordance with the command received from the customize command unit 118. The customized list display unit 119 displays a customized list of OH records generated by the customizing unit 118A. However, in the following description, it is supposed that the customize command unit 118 and the customized list display unit 119 are not provided in the DM apparatus 110A, and that the functions of the two units are achieved by the input unit 131 and the display unit 132 in the DO device 130.

Figure 16:
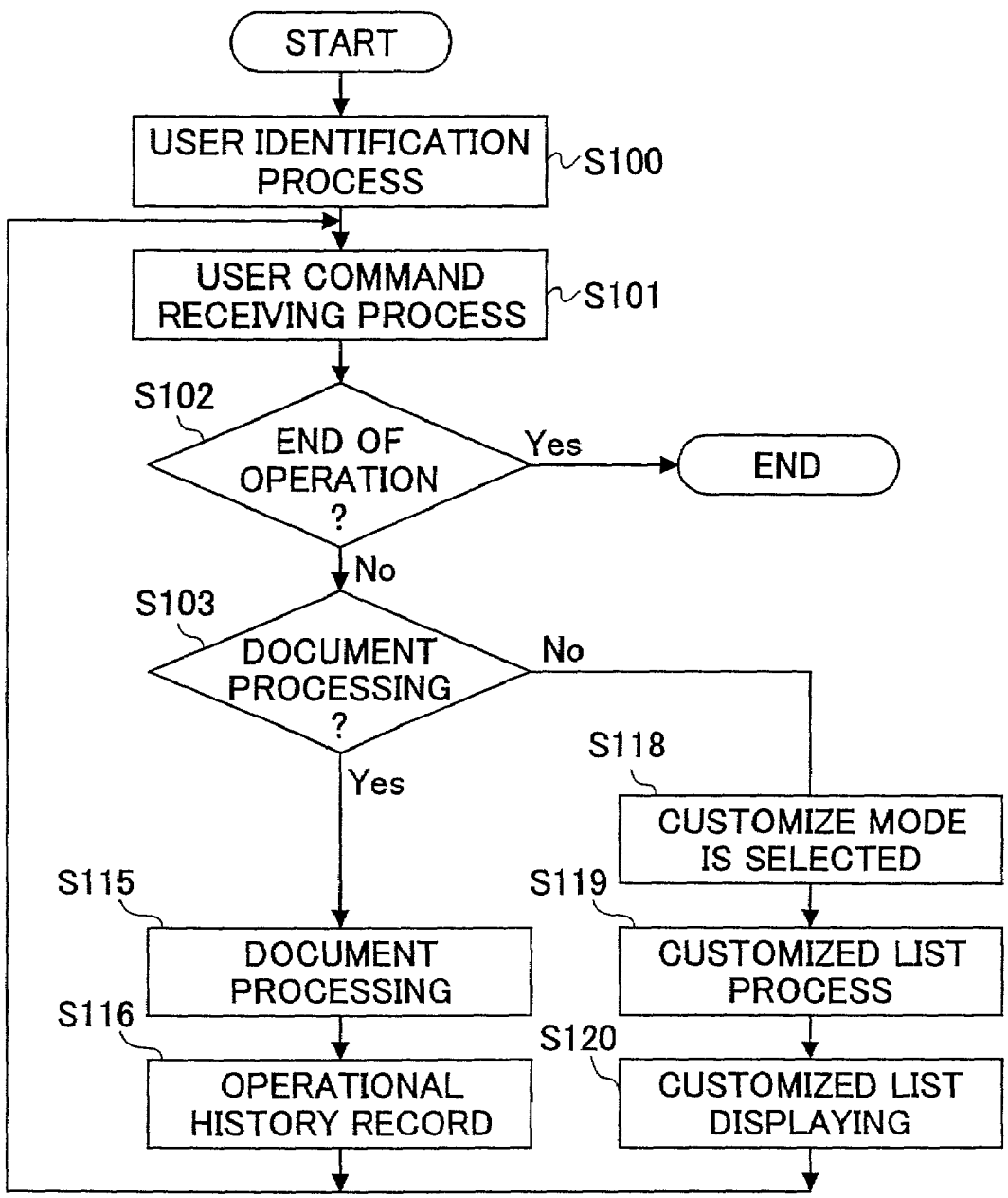
FIG. 16 is a flowchart for explaining a main routine performed by the document processing/management system of FIG. 15.

FIG. 16 shows a main routine performed by the document processing/management system 100 of FIG. 15. In FIG. 16, the steps that are essentially the same as corresponding steps in FIG. 6 are designated by the same reference numerals.

As shown in FIG. 16, at a start of the main routine, the DO device 130 performs the user identification process (S100). In the user identification process, the operator is requested to enter a user ID and a password from the input unit 131. The user ID and the password are displayed on the display unit 132. The DO device 130 checks whether the input user ID and password match with those of an authorized user. By this user identification process, it is possible for the system to identify the operator who manipulates the system during the main routine and inhibit an unauthorized person from illegally using the system.

After the step S100 is performed, the DO device 130 performs the user command receiving process (S101). In the user command receiving process, the DO device 130 displays a user command menu in the user command window 501 of the display unit 132. The user is requested to select one of commands from the user command menu of the user command window 501. In the present embodiment, the user can select one of three commands: (1) "document processing mode", (2) "customizing mode", and (3) "end of operation".

After the step S101 is performed, the DO device 130 determines whether the command "end of operation" is selected by the operator (S102). When the result at the step S102 is affirmative, the main routine of FIG. 16 ends and the DO device 130 is set in a waiting condition. Otherwise, the control of the DO device 130 is transferred to the next step S103.

In the step S103, the DO device 130 determines whether the command "document processing mode" is selected by the operator (S103). When the result at the step S103 is affirmative, the control of the DO device 130 is transferred to the next step S115.

In the step S115, the DO device 130 performs the document processing process that is essentially the same as that of the previous embodiment of FIG. 1. In the document processing process, the operator is requested to select, by using the input unit 131, one of the five operation types: new recording, overwriting, rename recording, printing and viewing. After the step S115 is performed, the DO device 130 performs the operational history record process in cooperation with the DM apparatus 110 (S116). After the step S116 is performed, the control of the DO device 130 is transferred to the step S101.

On the other hand, when the result at the step S103 is negative, the DO device 130 determines that the command "customizing mode" is selected by the operator (S118). For example, the operator is requested at this step to select one of a plurality of OH record classification options (e.g., yearly basis, monthly basis, and time period basis) in this customizing mode selection. After the selection is performed (S118), the DO device 130 requests the customizing unit 118A of the DM apparatus 110A to perform a customized list process (S119). In the customized list process, the customizing unit 118A generates a customized list of the OH records based on the results of the document classification, and stores the customized list of the OH records into the storage unit 119A.

After the customized list is stored in the storage unit 119A, the control unit 120 transmits the customized list from the DM apparatus 110A to the DO device 130. The DO device 130 displays the customized list of the OH records, which is received from the DM apparatus 110A, on the display unit 132 (S120). After the step S120 is performed, the control of the DO device 130 is transferred to the step S101.

Figure 17:
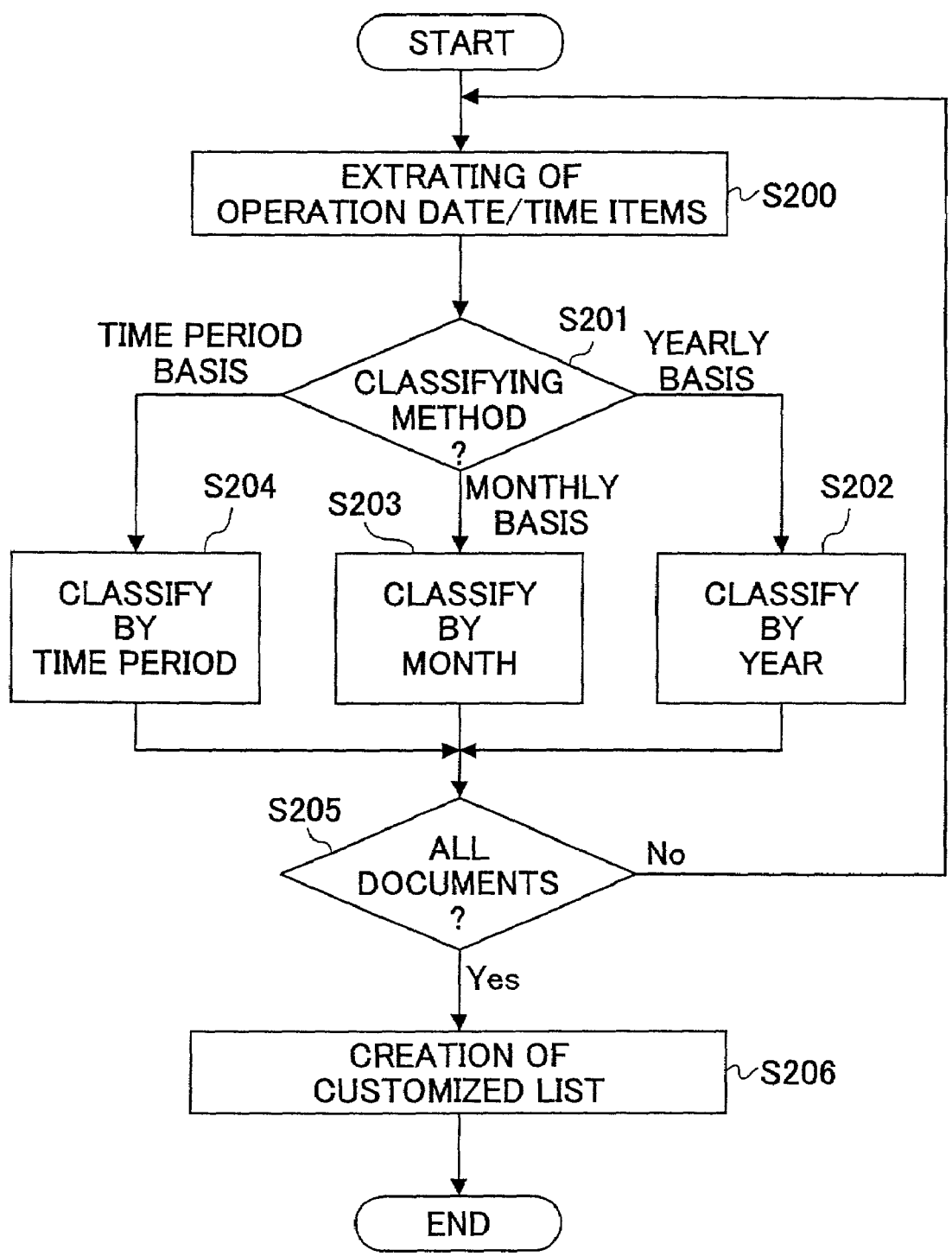
FIG. 17 is a flowchart for explaining a customized list process performed by the document management apparatus of the present embodiment using an operation date/time item.

FIG. 17 shows a customized list process performed by the document management apparatus of the present embodiment using an operation date/time item. The customized list process of FIG. 17 corresponds to the steps S118 and S119 in the main routine of FIG. 16.

In the present embodiment, it is supposed that one of the OH record classification options (yearly basis, monthly basis and time period basis) is already selected by the operator on the DO device 130 in the step S118. In addition, it is supposed that the format of the OH records stored in the storage unit 115 of the present embodiment is the same as the format of the OH records in the previous embodiment shown in FIG. 5.

As shown in FIG. 17, at a start of the process, the customizing unit 118A extracts the operation date/time item from the OH record with respect to one of the stored documents of the document storage unit 111 (S200). When two or more OH records are included for the subject document, the operation date/time item of the latest OH record among them is extracted.

After the step S200 is performed, the customizing unit 118A determines the classifying method in accordance with the operator selection that indicates one of the OH record classification options (S201). When the yearly basis option is selected, the customizing unit 118A performs a yearly basis classification of the OH record (S202). In the step S202, for example, the OH records are classified into a number of previous year groups by the operation date/time item of each OH record. When the monthly basis option is selected, the customizing unit 118A performs a monthly basis classification of the OH record (S203). In the step S203, for example, the OH records are classified into a number of previous month groups by the operation date/time item of each OH record. When the time period basis option is selected, the customizing unit 118A performs a time period basis classification of the OH record (S204). In the step S204, for example, the OH records are classified into a morning hour group and an afternoon hour group by the operation date/time item of each OH record.

When one of the steps S202, S203 and S204 is performed, the customizing unit 18A determines whether the classification of the OH records is performed for all of the stored documents (S205). When the result at the step S205 is negative, the control of the customizing unit 18A is transferred to the step S200. Otherwise, the customizing unit 18A generates a customized list of OH records based on the results of the classification (S206). After the step S206 is performed, the customized list process of FIG. 17 ends.

Figure 18:
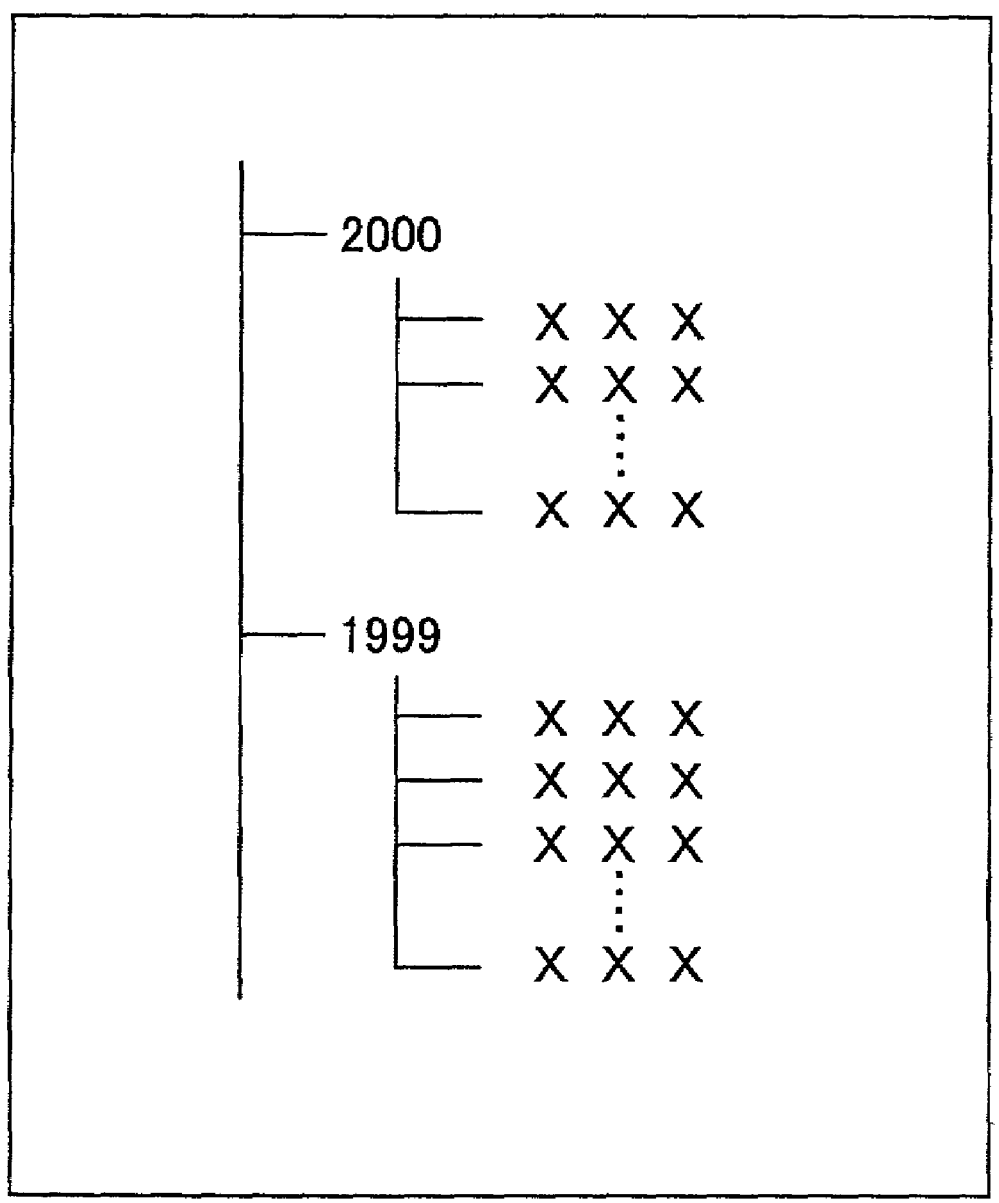
FIG. 18 is a diagram showing an example of a customized list of operational history records on a yearly basis.
Figure 19:
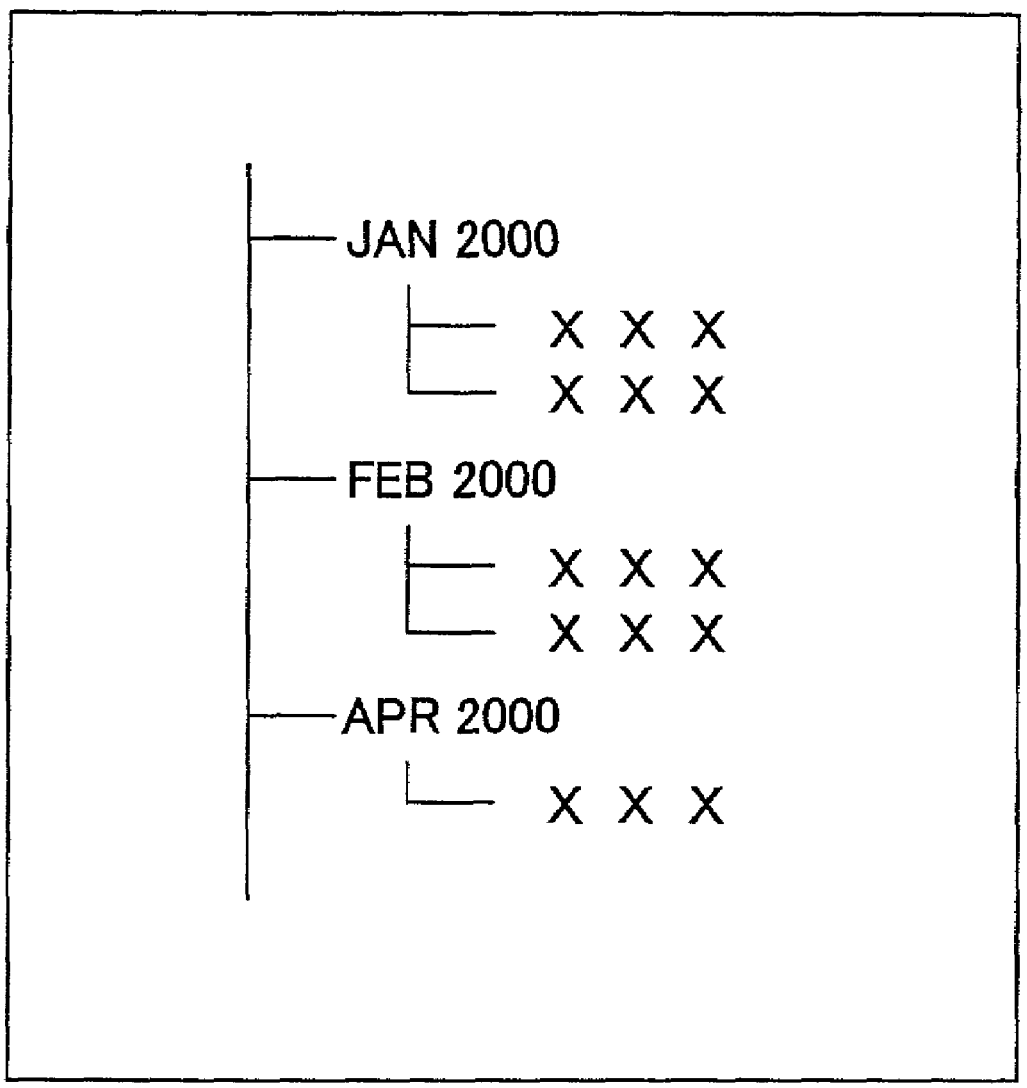
FIG. 19 is a diagram showing an example of a customized list of operational history records on a monthly basis.
Figure 20:
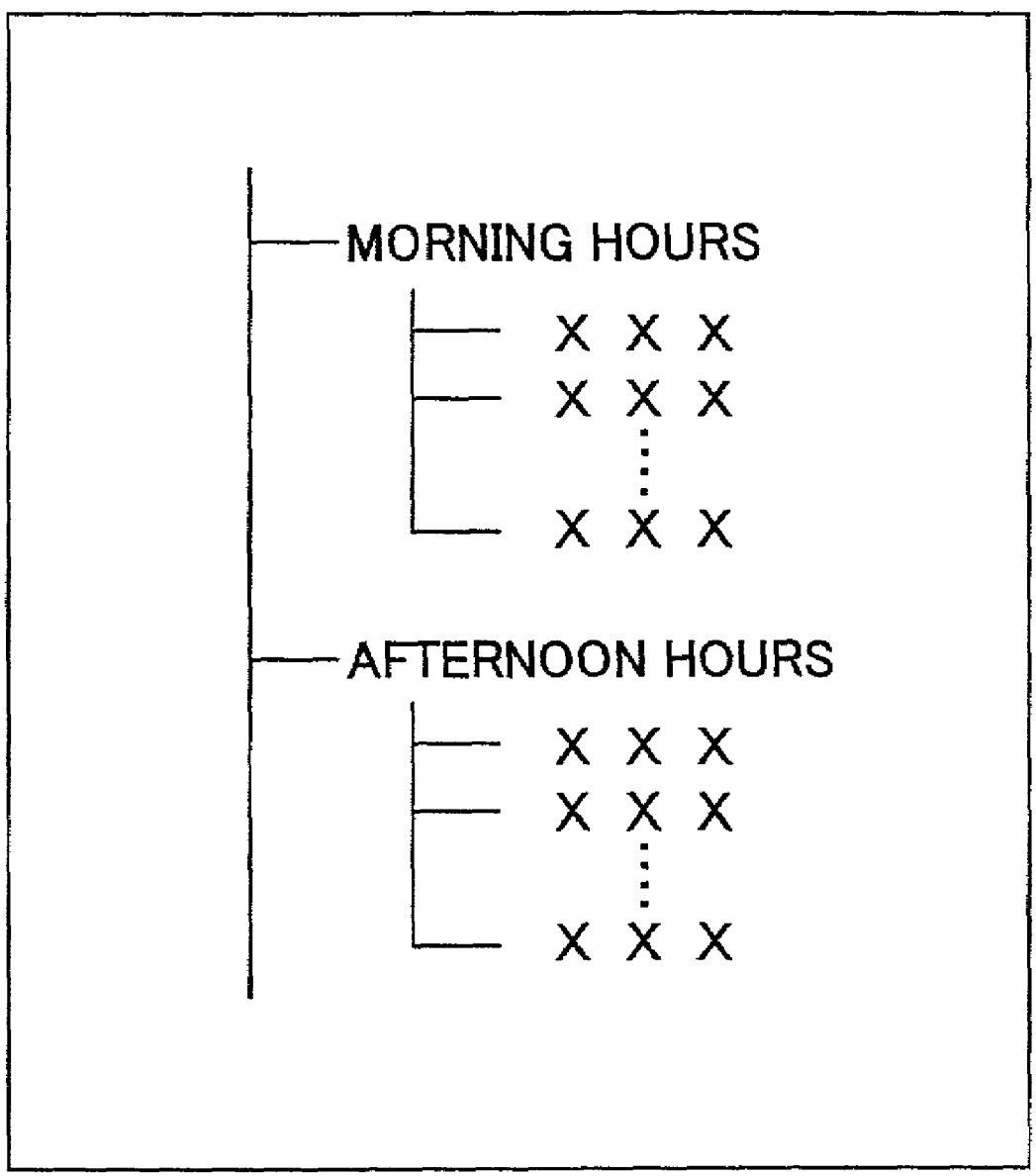
FIG. 20 is a diagram showing an example of a customized list of operational history records on a time period basis.

FIG. 18 shows an example of the customized list of operational history records on a yearly basis. FIG. 19 shows an example of the customized list of operational history records on a monthly basis. FIG. 20 shows an example of the customized list of operational history records on a time period basis. The customized lists of FIG. 18 through FIG. 20 are created by the performance of the customized list process of FIG. 17.

In the above-described embodiment, the operator can restrict a period of previous operation time for the customized list creation to a desired period (for example, from December 1998 to January 2000). Such restriction function can be achieved, if the latest operation date of the OH record at the step S200 of the flowchart of FIG. 17 is not included in the desired period, then the OH record of concern is excluded from the customized list creation.

Figure 30:
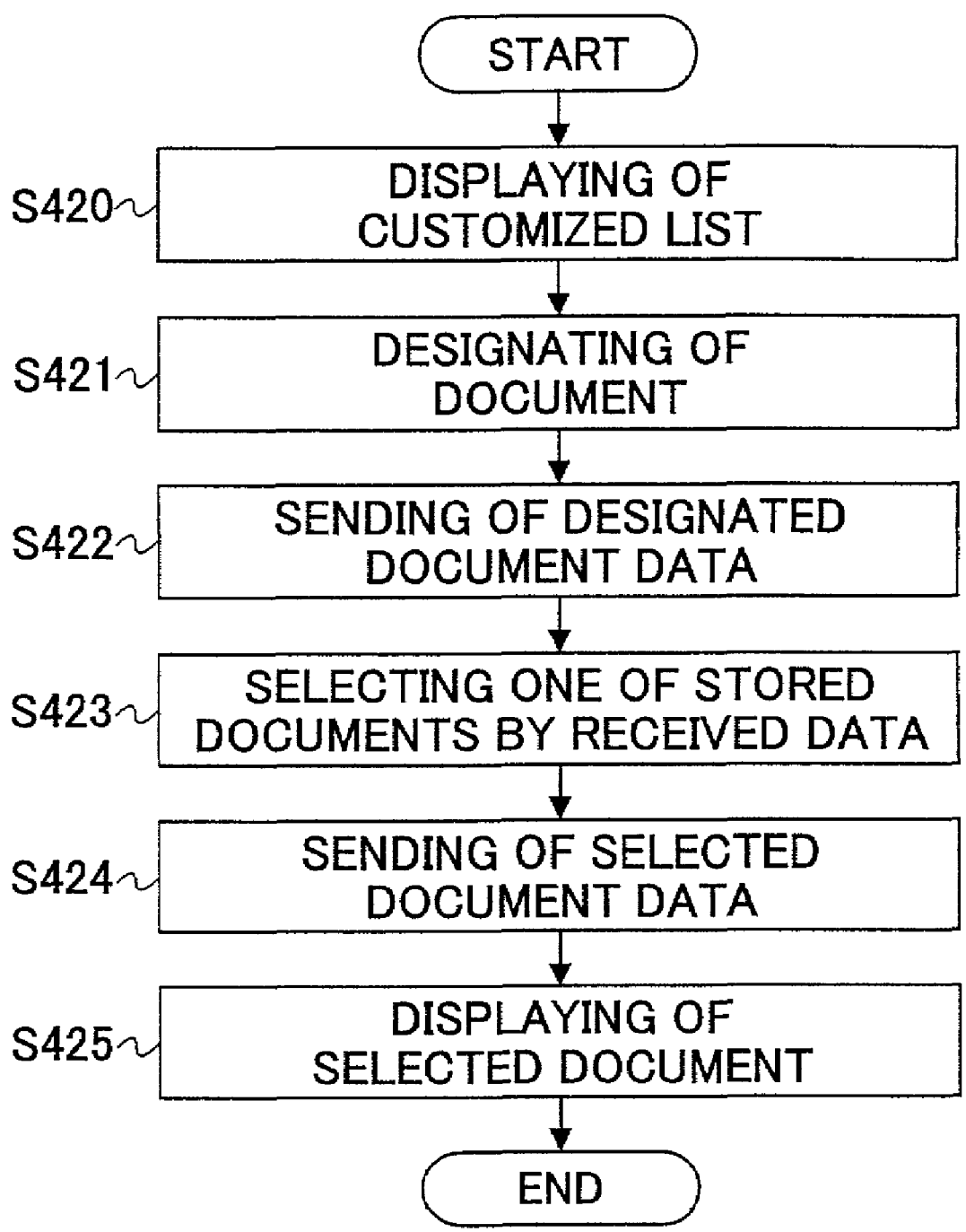
FIG. 30 is a flowchart for explaining a document selection process performed by the document management apparatus of the present embodiment using a customized list of operational history records.

FIG. 30 shows a document selection process performed by the document management apparatus of the present embodiment using a customized list of operational history records.

In the present embodiment, the document processing process (the step S115) in the main routine of FIG. 16 is modified such that the customized list of OH records is displayed on the display unit 132 during the processing of the current document, and the operator is allowed to view a selected one of the related documents in the customized list on the display unit 132.

As shown in FIG. 30, the DO device 130 receives the customized list of OH records from the storage unit 119A of the DM apparatus 110A and displays the customized list on the display unit 132 (S420). The operator is requested to designate one of the related documents in the customized list on the display unit 132 by using the input unit 131. The DO device 130 receives the designated document data from the input unit 313 (S421).

After the step S421 is performed, the DO device 130 transmits the designated document data to the DM apparatus 110A (S422). The control unit 120 of the DM apparatus 110A reads the DM information from the storage unit 113 by using the received document data, and detects the storage location of the designated document in the document storage unit 111 from the DM information. The control unit 120 selects the corresponding one of the stored documents of the document storage unit 111 for the designated document (S423). After the step S423 is performed, the control unit 120 transmits the data of the selected document from the storage unit 111 to the DO device 130 (S424).

After the step S424 is performed, the DO device 130 receives the selected document data from the DM apparatus 110A and displays the selected document on the display unit 132 (S425). After the step S424 is performed, the document selection process of FIG. 30 ends. According to the document management apparatus of the present embodiment, the user can easily and quickly view the desired document from among the customized list of OH records during the processing of the current document on the display unit 132.

Figure 21:
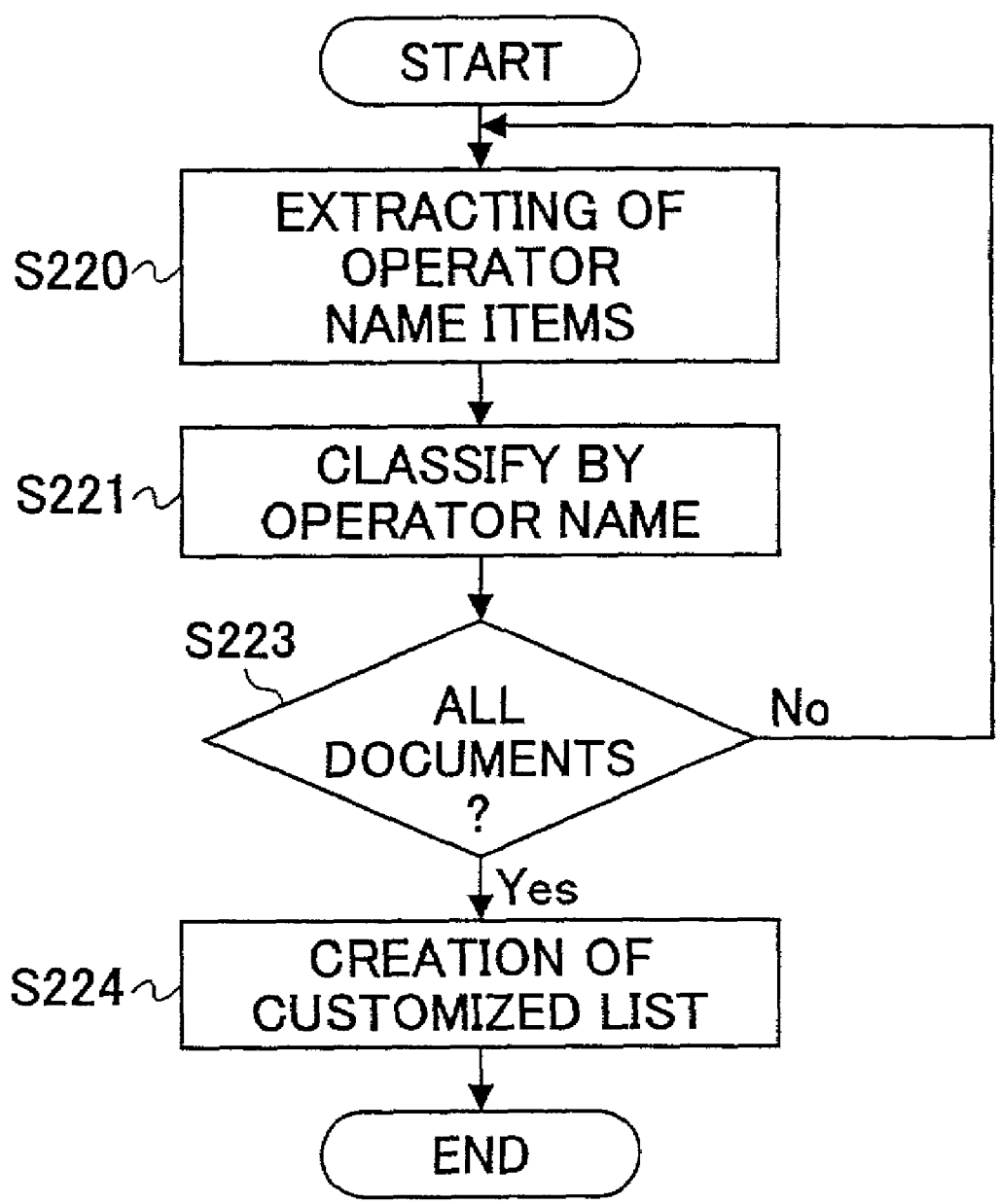
FIG. 21 is a flowchart for explaining a customized list process performed by the document management apparatus of the present embodiment using an operator name item.

FIG. 21 shows a customized list process performed by the document management apparatus of the present embodiment using an operator name item. The customized list process of FIG. 21 corresponds to the steps S118 and S119 in the main routine of FIG. 16. In the present embodiment, it is supposed that the format of the OH records stored in the OH record storage unit 115 is the same as the format of the OH records in the previous embodiment shown in FIG. 5.

As shown in FIG. 21, at a start of the process, the customizing unit 118A extracts the operator name item from the OH record with respect to one of the stored documents of the document storage unit 111 (S220). When two or more OH records are included for the subject document, the operator name item of the latest OH record among them is extracted.

After the step S220 is performed, the customizing unit 118A performs a classification of the OH records based on the user ID of the operator name item of each OH record (S221). After the step S221 is performed, the customizing unit 18A determines whether the classification of the OH records is performed for all of the stored documents (S223). When the result at the step S223 is negative, the control of the customizing unit 18A is transferred to the step S220. Otherwise, the customizing unit 18A generates a customized list of OH records based on the results of the classification (S224). After the step S224 is performed, the customized list process of FIG. 21 ends.

Figure 22:
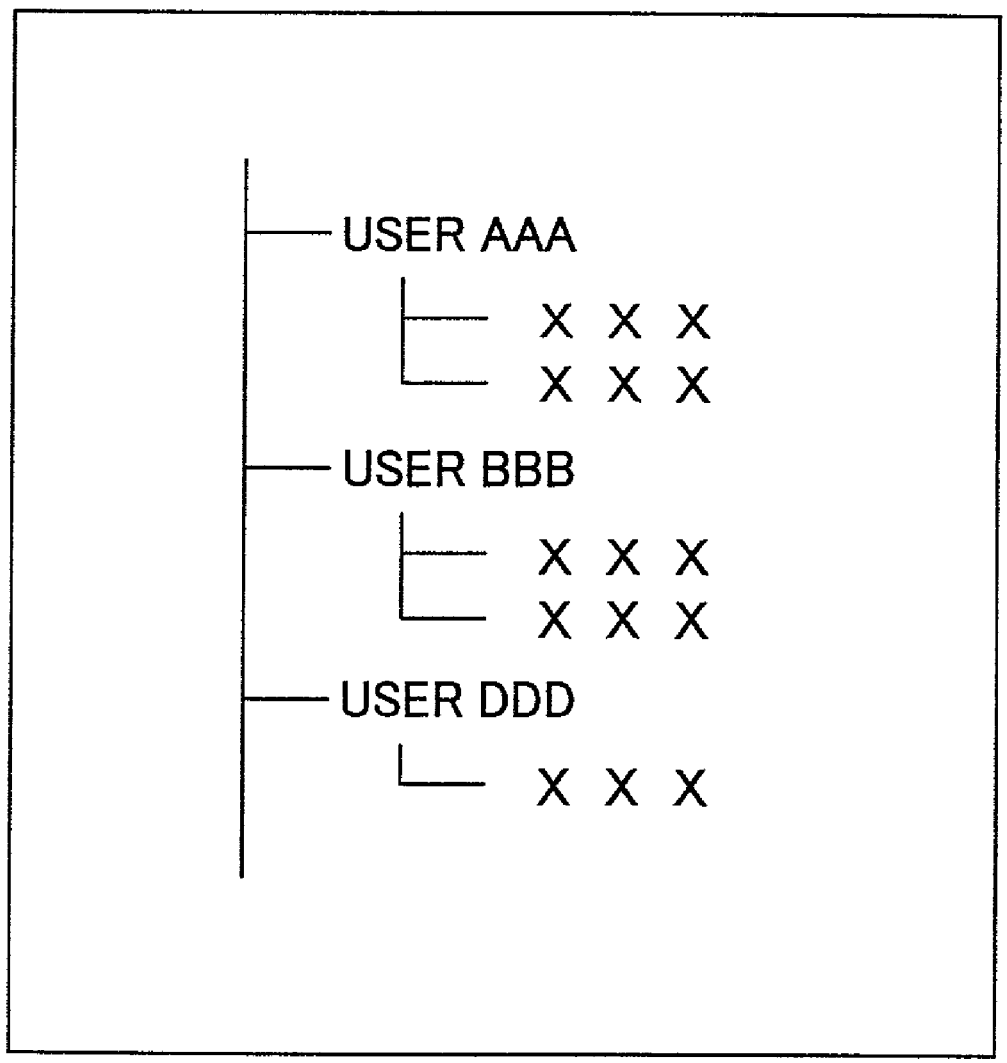
FIG. 22 is a diagram showing an example of a customized list of operational history records on a user ID basis.

FIG. 22 shows an example of a customized list of operational history records on a user ID basis. The customized list of FIG. 22 is created by the performance of the customized list process of FIG. 21.

Figure 23:
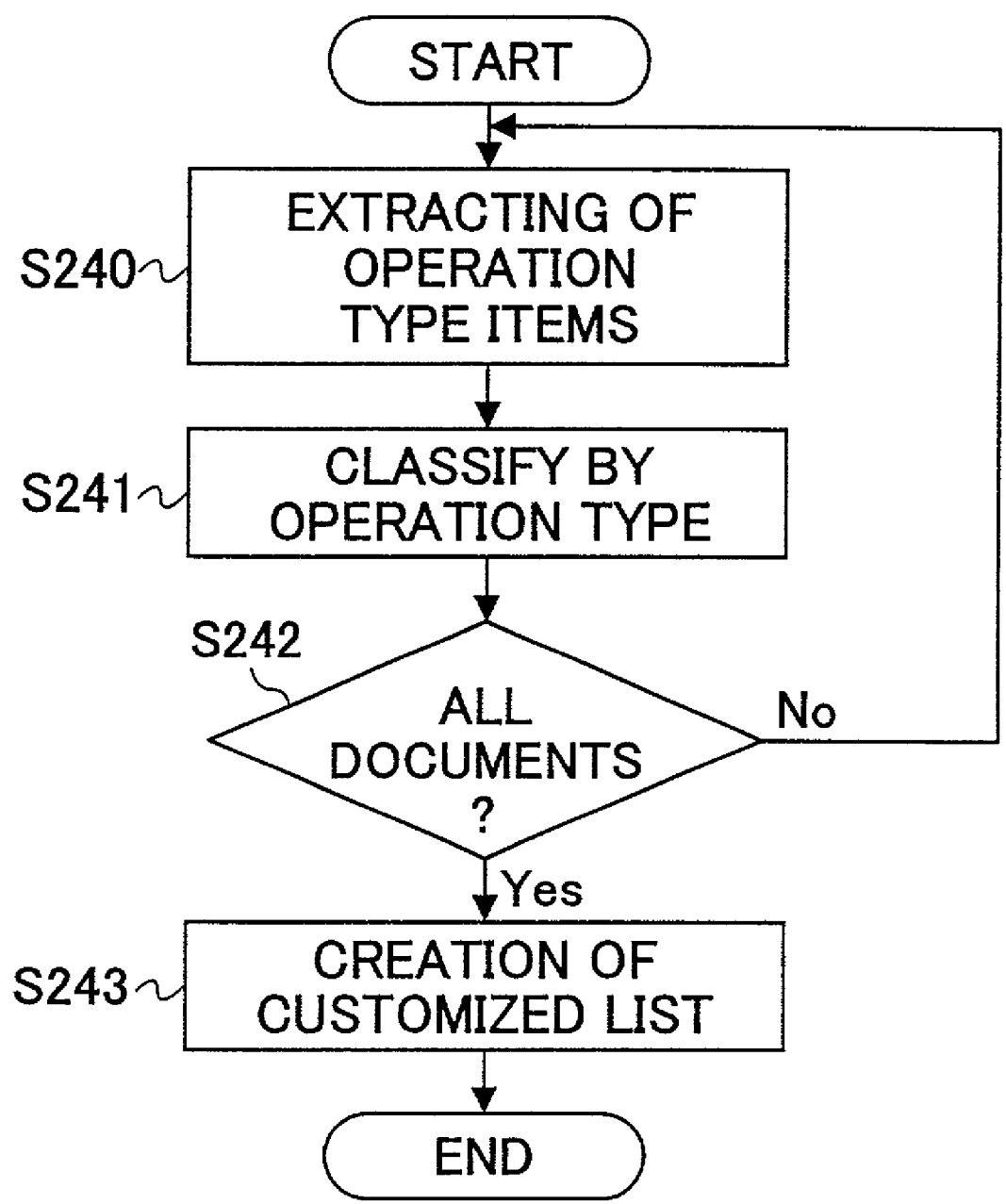
FIG. 23 is a flowchart for explaining a customized list process performed by the document management apparatus of the present embodiment using an operation type item.

FIG. 23 shows a customized list process performed by the document management apparatus of the present embodiment using an operation type item. The customized list process of FIG. 23 corresponds to the steps S118 and S119 in the main routine of FIG. 16. In the present embodiment, it is supposed that the format of the OH records stored in the OH record storage unit 115 is the same as the format of the OH records in the previous embodiment shown in FIG. 5.

As shown in FIG. 23, at a start of the process, the customizing unit 118A extracts the operation type item from the OH record with respect to one of the stored documents of the document storage unit 111 (S240). When two or more OH records are included for the subject document, the operation type item of the latest OH record among them is extracted.

After the step S240 is performed, the customizing unit 118A performs a classification of the OH records based on the operation type of the operator name item of each OH record (S241). After the step S241 is performed, the customizing unit 18A determines whether the classification of the OH records is performed for all of the stored documents (S242). When the result at the step S242 is negative, the control of the customizing unit 18A is transferred to the step S240. Otherwise, the customizing unit 18A creates a customized list of OH records based on the results of the classification (S243). After the step S243 is performed, the customized list process of FIG. 23 ends.

Figure 24:
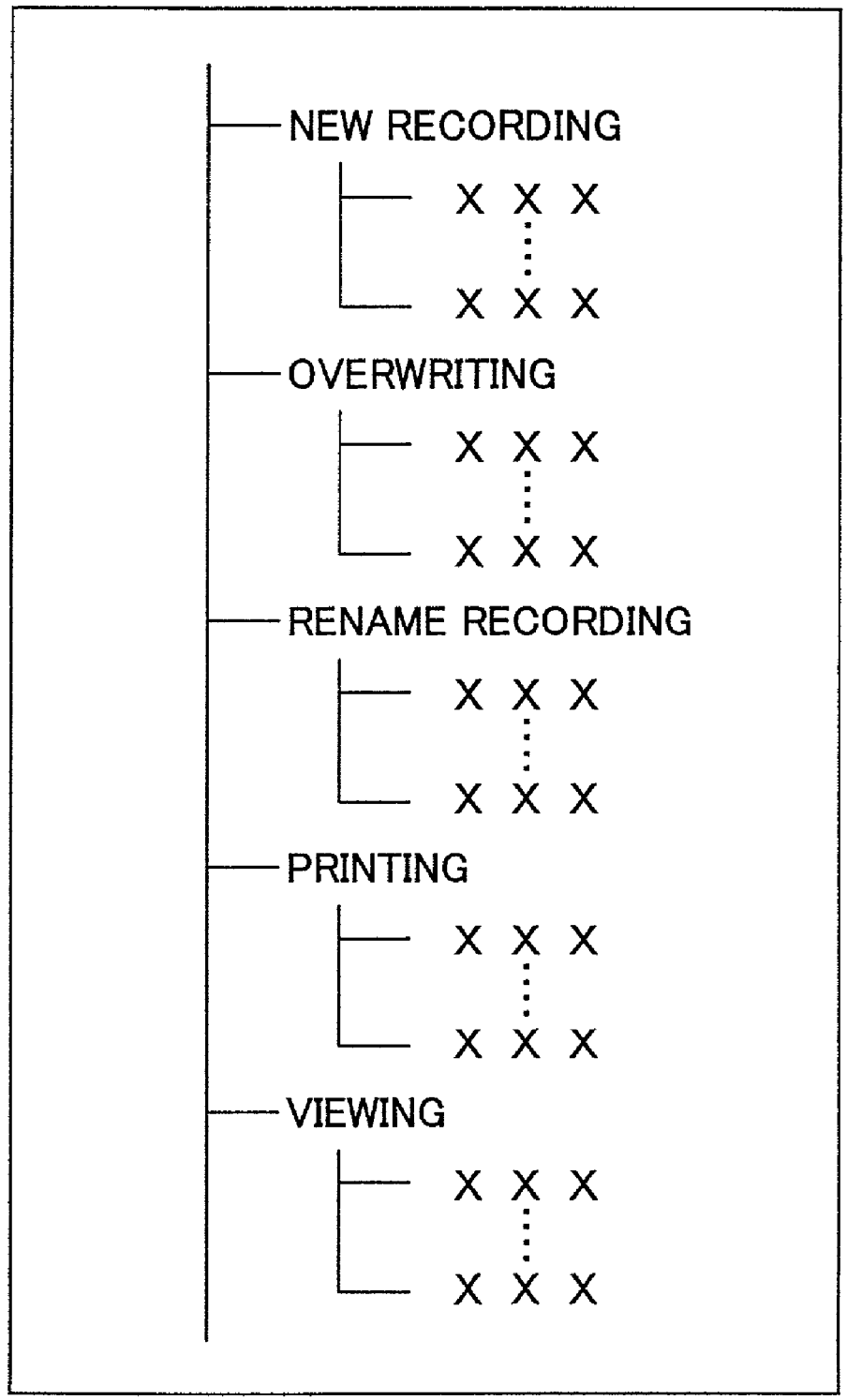
FIG. 24 is a diagram showing an example of a customized list of operational history records on an operation type basis.

FIG. 24 shows an example of a customized list of operational history records on an operation type basis. The customized list of FIG. 24 is created by the performance of the customized list process of FIG. 23.

Figure 25:
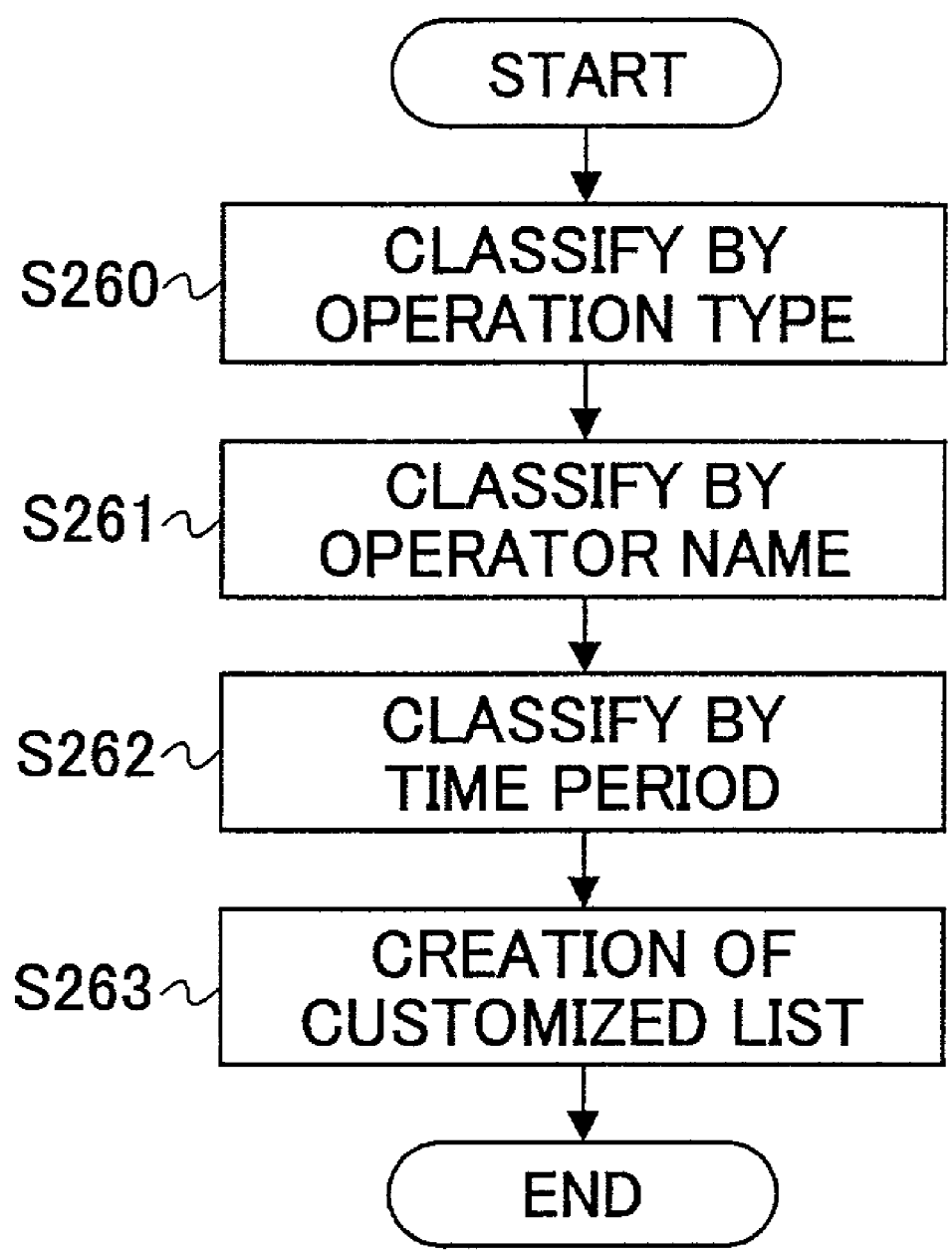
FIG. 25 is a flowchart for explaining a customized list process performed by the document management apparatus of the present embodiment using operation type, operator name and operation date/time items.

FIG. 25 shows a customized list process performed by the document management apparatus of the present embodiment using operation type, operator name and operation date/time items. The customized list process of this embodiment is a combination of the above-described processes of FIG. 17, FIG. 21 and FIG. 23.

As shown in FIG. 25, at a start of the customized list process, the customizing unit 118A performs an operation type basis classification of the OH records (S260). The process of the step S260 is essentially the same as the process of the steps S240 through S242 in the customized list process of FIG. 23, and a description thereof will be omitted.

After the step S260 is performed, the customizing unit 118A performs an operator name basis classification of the OH records (S261). The process of the step S261 is essentially the same as the process of the steps S220 through S223 in the customized list process of FIG. 21, and a description thereof will be omitted.

After the step S261 is performed, the customizing unit 118A performs a time period basis classification of the OH records (S262). The process of the step S262 is essentially the same as the process of the steps S200 through S205 in the customized list process of FIG. 17, and a description thereof will be omitted.

After the step S262 is performed, the customizing unit 118A creates a customized list of OH records based on the results of the three classifications (S263). After the step S263 is performed, the customized list process of FIG. 25 ends.

Figure 26:
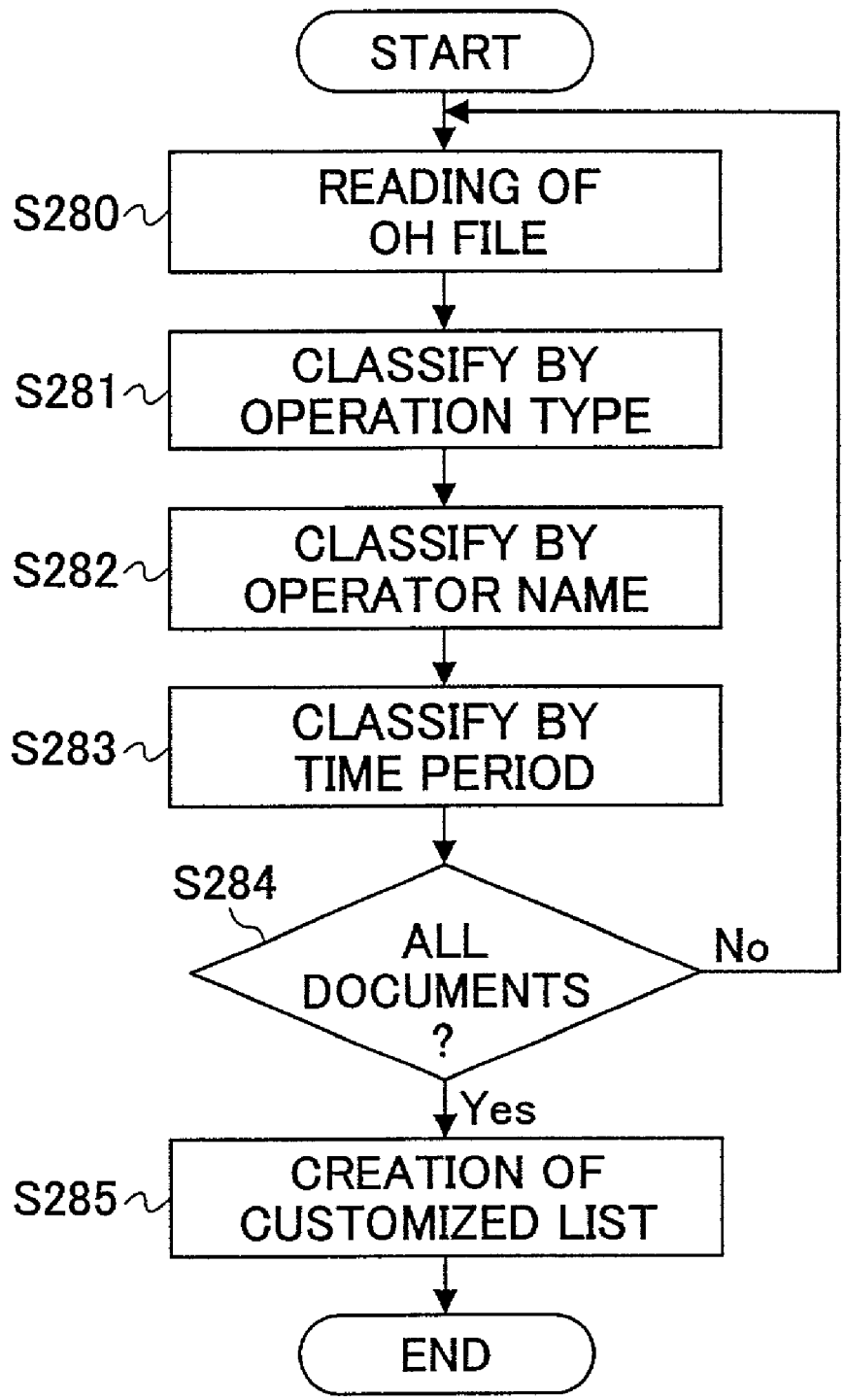
FIG. 26 is a flowchart for explaining a customized list process performed by the document management apparatus of the present embodiment using operation type, operator name and operation date/time items.

FIG. 26 shows another customized list process performed by the document management apparatus of the present embodiment using operation type, operator name and operation date/time items.

As shown in FIG. 26, at a start of the process, the customizing unit 118A reads the operational history (OH) file of one of the stored documents of the document storage unit 111 from the storage unit 115 by using the file name of the OH file obtained from the DM information of the storage unit 113 (S280).

After the step S280 is performed, the customizing unit 118A performs an operation type basis classification of the OH records (S281). The process of the step S281 is essentially the same as the process of the steps S240 through S242 in the customized list process of FIG. 23, and a description thereof will be omitted. After the step S281 is performed, the customizing unit 118A performs an operator name basis classification of the OH records (S282). The process of the step S282 is essentially the same as the process of the steps S220 through S223 in the customized list process of FIG. 21, and a description thereof will be omitted.

After the step S282 is performed, the customizing unit 118A performs a time period basis classification of the OH records (S283). The process of the step S283 is essentially the same as the process of the steps S200 through S205 in the customized list process of FIG. 17, and a description thereof will be omitted.

After the step S283 is performed, the customizing unit 118A determines whether the classification of OH records is performed for all of the stored documents of the storage unit 111 (S284). When the result at the step S284 is negative, the control of the customizing unit 118A is transferred to the step S280. The same processes are repeated until the classification of all of the stored documents is done.

Otherwise, the customizing unit 18A creates a customized list of OH records based on the results of the three classifications (S285). After the step S285 is performed, the customized list process of FIG. 26 ends.

Figure 27:
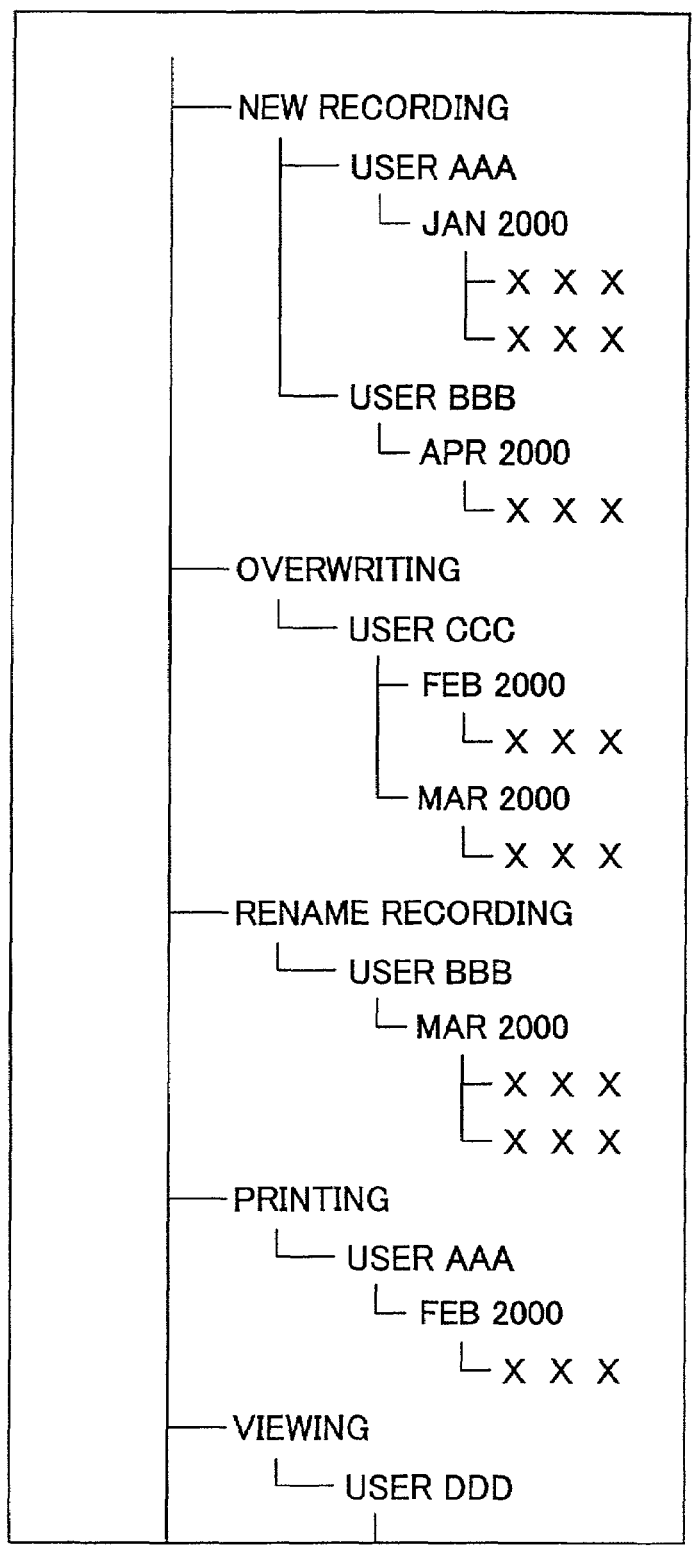
FIG. 27 is a diagram showing an example of a customized list of operational history records on the basis of operation type, operator name and operation date.

FIG. 27 shows an example of a customized list of operational history records on the basis of operation type, operator name and operation date. The customized list of FIG. 27 is created by the performance of either the customized list process of FIG. 25 or the customized list process of FIG. 26.

Figure 28:
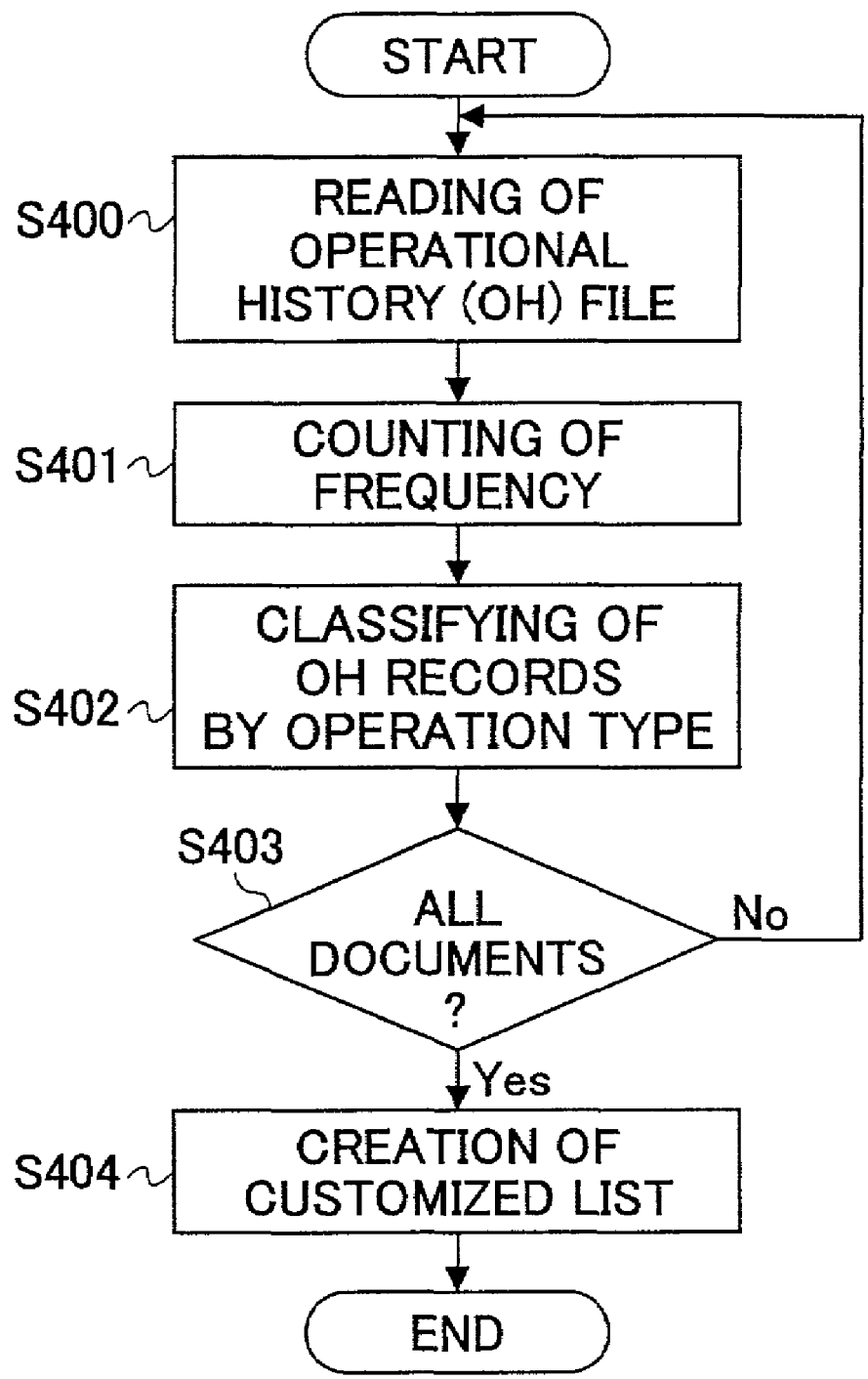
FIG. 28 is a flowchart for explaining a customized list process performed by the document management apparatus of the present embodiment using operation type and operation frequency items.

FIG. 28 shows a customized list process performed by the document management apparatus of the present embodiment using operation type and operation frequency items.

As shown in FIG. 28, at a start of the process, the customizing unit 118A reads the operational history (OH) file of one of the stored documents of the document storage unit 111 from the storage unit 115 by using the file name of the OH file obtained from the DM information of the storage unit 113 (S400).

After the step S400 is performed, the customizing unit 118A reads the respective operation type items of all of the OH records included in the OH file, and counts the number of viewing operations (the viewing frequency), the number of printing operations (the printing frequency), the number of overwriting operations (the overwriting frequency) and the total number of the respective operations (the total frequency), based on the operation type items of the OH records (S401).

After the step S401 is performed, the customizing unit 118A performs a classification of the OH records on the basis of the operation type of each OH record (that is, each of the viewing frequency, the printing frequency, the overwriting frequency and the total frequency) (S402).

After the step S402 is performed, the customizing unit 118A determines whether the classification of the OH records is performed for all of the stored documents of the storage unit 111 (S403). When the result at the step S403 is negative, the control of the customizing unit 118A is transferred to the step S400. The same processes are repeated until the classification of all of the stored documents is done.

Otherwise, the customizing unit 18A creates a customized list of OH records based on the results of the operation frequency basis classification (S404). After the step S404 is performed, the customized list process of FIG. 28 ends.

Figure 29:
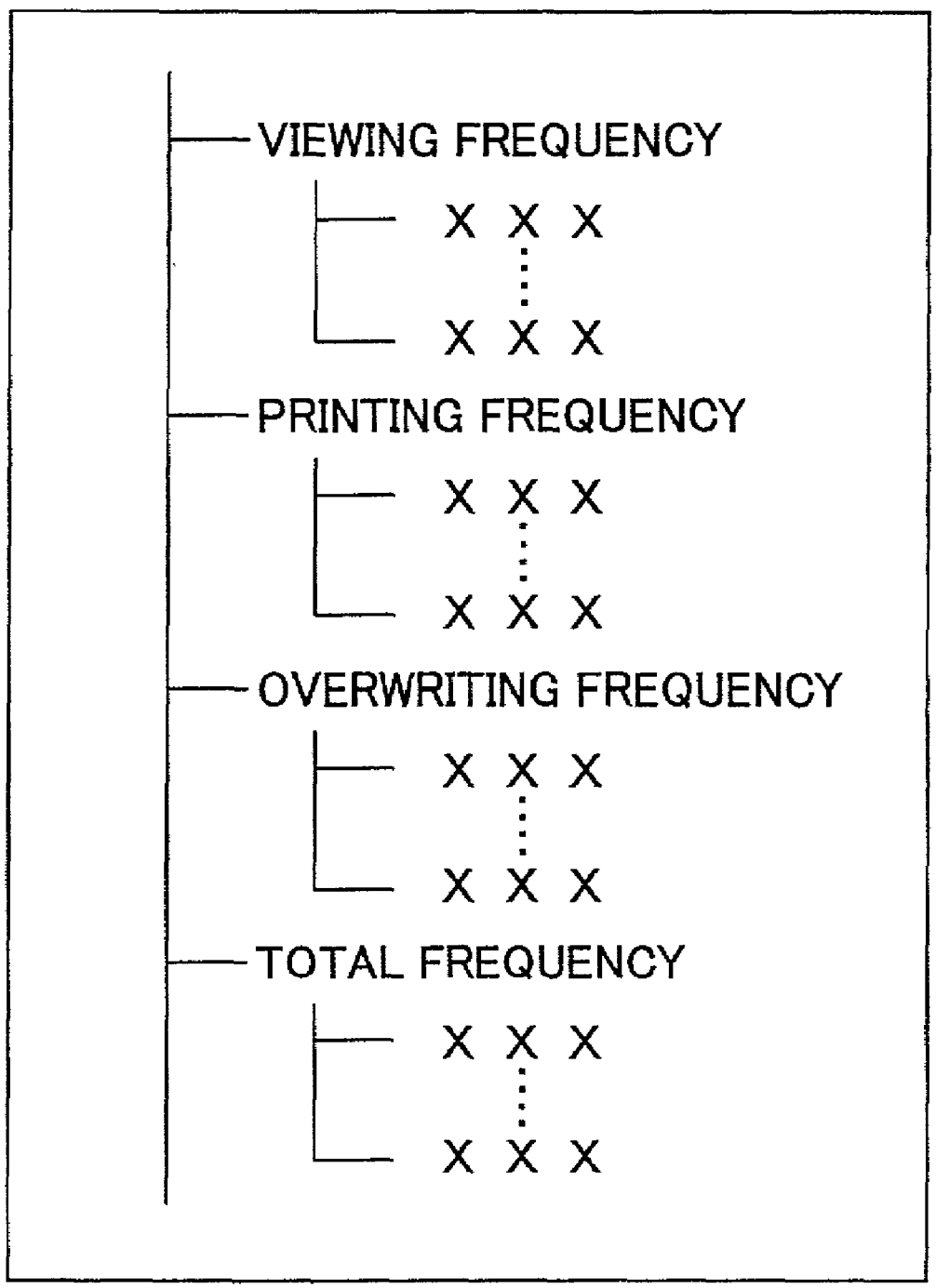
FIG. 29 is a diagram showing an example of a customized list of operational history records on the basis of operation type and operation frequency.

FIG. 29 shows an example of a customized list of operational history records on the basis of operation type and operation frequency. The customized list of FIG. 29 is created by the performance of the customized list process of FIG. 28.

As described above, the document management apparatus and the related document extracting method of the above-described embodiments are effective in automatically extracting the related documents, related to the currently processed document, from the group of stored documents. It is unnecessary for the above embodiments to perform the preparatory tasks, such as the document classification, the document relation determination and keyword inputting as in the conventional methods.

The present invention is not limited to the above-described embodiment, and variations and modifications may be made without departing from the scope of the present invention.

Further, the present invention is based on Japanese priority application No.2000-214106, filed on Jul. 14, 2000, Japanese priority application No.2000-342758, filed on Nov. 10, 2000, and Japanese priority application No.2001-118992, filed on Apr. 18, 2001, the entire contents of which are hereby incorporated by reference.

What is claimed is:

1. A document management apparatus which manages a group of documents stored in a document storage device, the document management apparatus comprising:
a first unit generating an operational history record of one of the stored documents of the group every time an operation on said one of the stored documents is performed by a document operation device;
a second unit storing the operational history records generated by the first unit; and
a third unit determining whether a selected item of the operational history record, stored for a currently processed document among the stored documents, matches with a corresponding item of each of the operational history records, stored for the remaining ones of the stored documents other than the currently processed document, so that the third unit extracts a list of related documents, which are related to the currently processed document, from the remaining ones of the stored documents of the group, based on results of the matching, and
wherein the third unit performs the matching between the currently processed document and the remaining ones of the stored documents of the group with respect to at least one item of each operational history record, and
wherein the third unit comprises a document relation estimating unit calculating an estimated degree of relation between the currently processed document and each of the remaining ones of the stored documents of the group by a length of operation time period for which a value of an operation time period item of the operational history record of the currently processed document overlaps with a value of a corresponding operation time period item of each of the operational history records of the remaining documents, so that the third unit extracts the list of related documents based on the estimated degrees of relation calculated for the remaining ones of the stored documents.

2. The document management apparatus of claim 1, wherein said at least one item of each operational history record is selectable from among items contained in each operational history record.

3. The document management apparatus of claim 1, wherein said at least one item of each operational history record is selected by the document operation device from among items contained in each operational history record.

4. The document management apparatus of claim 1, wherein each operational history record contains an item of date and time of operation for one of the stored documents of the group.

5. The document management apparatus of claim 1, wherein each operational history record contains an item of operator name for one of the stored documents of the group.

6. The document management apparatus of claim 1, wherein each operational history record contains an item of operation type for one of the stored documents of the group.

7. The document management apparatus of claim 1, wherein each operational history record contains an item of time period of operation for one of the stored documents of the group, and wherein the document relation estimating unit calculates an estimated degree of relation between the currently processed document and each of the remaining ones of the stored documents by using the item of the operation time period of the currently processed document when said item is selected.

8. The document management apparatus of claim 1, wherein each operational history record contains an item of the number of reference accesses for one of the stored documents of the group, and wherein the document relation estimating unit calculates an estimated degree of relation between the currently processed document and each of the remaining ones of the stored documents by using the item of the reference access number of the currently processed document when said item is selected.

9. The document management apparatus of claim 1, wherein each operational history record contains an item of amount of copied data for one of the stored documents of the group, and wherein the document relation estimating unit calculates an estimated degree of relation between the currently processed document and each of the remaining ones of the stored documents by using the item of the copied data amount of the currently processed document when said item is selected.

10. The document management apparatus of claim 1, wherein each of the stored documents of the group contains a related document indication list the related document indication list indicating a list of storage locations of related documents that are subjected to either copying operations to the document or reference accesses from the document, and wherein the document relation estimating unit calculates an estimated degree of relation between the currently processed document and each of the remaining ones of the stored documents by using the related document indication list of the currently processed document.

11. The document management apparatus of claim 1, wherein the third unit transmits the list of related documents to the document operation device, so that the document operation device outputs the list of related document in a recognizable form.

12. The document management apparatus of claim 1, wherein the third unit stores a correlation between the list of related documents and an identifier of the operator who has processed the current document, together with the list of related documents, and, when the operator starts processing a new document, the third unit reads the list of related documents in response to the operator identifier by using the correlation between the list of related documents and the operator identifier.

13. The document management apparatus of claim 11, further comprising a document transmission unit transmitting when a request of outputting a related document contained in the list of related documents is received from the document operation device, data of said related document from the document storage device to the document operation device.

14. The document management apparatus of claim 1, wherein the document management apparatus is connected to the document storage device via a network.

15. The document management apparatus of claim 1, wherein the document management apparatus is connected to the document operation device via a network.

16. A related document extracting method for use in a document management apparatus which manages a group of documents stored in a document storage device, comprising the steps of:
generating an operational history record of one of the stored documents of the group every time an operation on said one of the stored documents is performed by a document operation device;
storing the operational history records generated in said generating step;
determining whether a selected item of the operational history record, stored for a currently processed document among the stored documents of the group, matches with a corresponding item of each of the operational history records, stored for the remaining ones of the stored documents other than the currently processed document; and
extracting a list of related documents, which are related to the currently processed document, from the remaining ones of the stored documents of the group, based on results of the matching in the determining step, and
wherein the matching between the currently processed document and the remaining ones of the stored documents of the group is performed with respect to at least one item of each operational history record, and
wherein the document management apparatus comprises a document relation estimating unit, and wherein the estimating unit calculates an estimated degree of relation between the currently processed document and each of the remaining ones of the stored documents of the group by a length of operation time period for which a value of an operation time period item of the operational history record of the currently processed document overlaps with a value of a corresponding operation time period item of each of the operational history records of the remaining documents, so that the list of related documents is extracted based on the estimated degrees of relation calculated for the remaining ones of the stored documents.

17. The related document extracting method of claim 16, wherein said at least one item of each operational history record is selected by an operator who processes the current document on the document operation device, from among items contained in each operational history record.

18. The related document extracting method of claim 16, wherein each operational history record contains an item of date and time of operation for one of the stored documents of the group.

19. The related document extracting method of claim 16, wherein each operational history record contains an item of operator name for one of the stored documents of the group.

20. The related document extracting method of claim 16, wherein each operational history record contains an item of operation type for one of the stored documents of the group.

21. The related document extracting method of claim 16, wherein each operational history record contains an item of time period of operation for one of the stored documents of the group, and wherein, in the determining step, an estimated degree of relation between the currently processed document and each of the remaining ones of the stored documents is calculated by using the item of the operation time period of the currently processed document when the item of the operation time period is selected.

22. The related document extracting method of claim 16, wherein each operational history record contains an item of the number of reference accesses for one of the stored documents of the group, and wherein, in the determining step, an estimated degree of relation between the currently processed document and each of the remaining ones of the stored documents is calculated by using the item of the reference access number of the currently processed document when the item of the reference access number is selected.

23. The related document extracting method of claim 16, wherein each operational history record contains an item of the amount of copied data for one of the stored documents of the group, and wherein, in the determining step, an estimated degree of relation between the currently processed document and each of the remaining ones of the stored documents is calculated by using the item of the copied data amount of the currently processed document when the item of the copied data amount is selected.

24. The related document extracting method of claim 16, wherein each of the stored documents of the group contains a related document indication list, the related document indication list indicating a list of storage locations of related documents that are subjected to either copying operations to the document or reference accesses from the document and wherein, in the determining step, an estimated degree of relation between the currently processed document and each of the remaining ones of the stored documents is calculated by using the related document indication list of the currently processed document.

25. A document processing assist method for use in a document management apparatus which manages a group of documents stored in a document storage device, comprising the steps of:
generating an operational history record of one of the stored documents of the group every time an operation on said one of the stored documents is performed by a document operation device;
storing the operational history records generated in said generating step;
determining whether a selected item of the operational history record, stored for a currently processed document among the stored documents of the group, matches with a corresponding item of each of the operational history records, stored for the remaining ones of the stored documents other than the currently processed document;
extracting a list of related documents, which are related to the currently processed document, from the remaining ones of the stored documents of the group, based on results of the matching in the determining step; and
transmitting the list of related documents from the document management apparatus to an output unit of the document operation device so that the output unit provides the list of related documents, received from the document management apparatus, to an operator who processes the current document on the document operation device, and
wherein the matching between the currently processed document and the remaining ones of the stored documents of the group is performed with respect to at least one item of each operational history record, and
wherein the document management apparatus comprises a document relation estimating unit, and wherein the estimating unit calculates an estimated degree of relation between the currently processed document and each of the remaining ones of the stored documents of the group by a length of operation time period for which a value of an operation time period item of the operational history record of the currently processed document overlaps with a value of a corresponding operation time period item of each of the operational history records of the remaining documents, so that the list of related documents is extracted based on the estimated degrees of relation calculated for the remaining ones of the stored documents.

26. The document processing assist method of claim 25, further comprising the step of storing a correlation between the received list of related documents and the operator of the current document on the document operation device, wherein, when the operator processes the current document on the document operation device, the output unit provides the list of related documents to the operator in accordance with the store correlation.

27. The document processing assist method of claim 25, further comprising the step of transmitting, when the operator selects one of the related documents from the list data of the selected related document from the document management apparatus to the output unit of the document operation device so that the output unit provides the data of the selected related document, received from the document management apparatus, to the operator.

28. A computer-readable recording medium storing program code instructions causing a processor to execute a related document extracting process on a document management apparatus which manages a group of documents stored in a document storage device, comprising:

first program code means causing the processor to generate respective operational history records of the stored documents of the group in response to an operation performed on each document by a document operation device;

second program code means causing the processor to store the operational history records generated by the first program code means;

third program code means causing the processor to determine whether a selected item of the operational history record, stored for a currently processed document among the stored documents of the group, matches with a corresponding item of each of the operational history records, stored for the remaining ones of the stored documents other than the currently processed document; and fourth program code means causing the processor to extract a list of related documents, which are related to the currently processed document, from the remaining ones of the stored documents of the group, based on results of the matching by the third program code means, and wherein the matching between the currently processed document and the remaining ones of the stored documents of the group is performed with respect to at least one item of each operational history record, and wherein the document management apparatus comprises a document relation estimating unit and wherein the estimating unit calculates an estimated degree of relation between the currently processed document and each of the remaining ones of the stored documents of the group by a length of operation time period for which a value of an operation time period item of the operational history record of the currently processed document overlaps with a value of a corresponding operation time period item of each of the operational history records of the remaining documents, so that the list of related documents is extracted based on the estimated degrees of relation calculated for the remaining ones of the stored documents.

* * * * *